US012224817B2

United States Patent
Jeon et al.

(10) Patent No.: US 12,224,817 B2
(45) Date of Patent: Feb. 11, 2025

(54) APPARATUS AND METHOD OF UPLINK BEAMFORMING IN WIRELESS LOCAL AREA NETWORK SYSTEM

(71) Applicant: Samsung Electronics Co., Ltd., Suwon-si (KR)

(72) Inventors: Eunsung Jeon, Suwon-si (KR); Chulho Chung, Suwon-si (KR); Myeongjin Kim, Suwon-si (KR); Jonghun Han, Suwon-si (KR)

(73) Assignee: Samsung Electronics Co., Ltd., Gyconggi-do (KR)

( * ) Notice: Subject to any disclaimer, the term of this patent is extended or adjusted under 35 U.S.C. 154(b) by 457 days.

(21) Appl. No.: 17/530,047

(22) Filed: Nov. 18, 2021

(65) Prior Publication Data

US 2022/0158696 A1   May 19, 2022

(30) Foreign Application Priority Data

Nov. 19, 2020 (KR) .................. 10-2020-0155426
Apr. 5, 2021 (KR) .................. 10-2021-0044301
Apr. 22, 2021 (KR) .................. 10-2021-0052529

(51) Int. Cl.
*H04B 7/0417* (2017.01)
*H04B 7/06* (2006.01)
*H04L 5/00* (2006.01)
*H04W 84/12* (2009.01)

(52) U.S. Cl.
CPC ......... *H04B 7/0417* (2013.01); *H04B 7/0617* (2013.01); *H04B 7/0626* (2013.01); *H04L 5/0048* (2013.01); *H04W 84/12* (2013.01)

(58) Field of Classification Search
CPC .. H04B 7/0417; H04B 7/0617; H04B 7/0626; H04W 84/12
See application file for complete search history.

(56) References Cited

U.S. PATENT DOCUMENTS 10,158,413 B2 * 12/2018 Moon ................. H04B 7/0639
10,278,172 B2    4/2019 Chun et al.
10,412,769 B2    9/2019 Cherian et al.
(Continued)

OTHER PUBLICATIONS

IEEE P802.11 Wireless LANs doc.: IEEE 802.11-16/0773r2 Jun. 2016 (Year: 2016).*

(Continued)

*Primary Examiner* — Charles C Jiang
*Assistant Examiner* — Rachel Elizabeth Marks
(74) *Attorney, Agent, or Firm* — Harness, Dickey & Pierce, P.L.C.

(57) ABSTRACT

A method for a first device to communicate with at least one second device in a wireless local area network (WLAN) system includes providing a first trigger frame to at least one second device, the first trigger frame requesting at least one sounding null data packet (NDP), providing a feedback frame to the at least one second device, the feedback frame including feedback information generated based on the at least one sounding NDP, and providing a second trigger frame to the at least one second device, the second trigger frame requesting at least one beamformed physical layer protocol data unit (PPDU), each of the first trigger frame and the feedback frame including a sounding dialog token number field having a sounding sequence number.

19 Claims, 27 Drawing Sheets

(56) References Cited

U.S. PATENT DOCUMENTS

| | | | | |
|---|---|---|---|---|
| 11,051,284 | B2* | 6/2021 | Ghosh | H04W 72/21 |
| 2016/0100396 | A1* | 4/2016 | Seok | H04L 5/003 |
| | | | | 370/329 |
| 2016/0330732 | A1* | 11/2016 | Moon | H04B 7/0639 |
| 2018/0331749 | A1* | 11/2018 | Ghosh | H04L 1/00 |
| 2018/0359761 | A1* | 12/2018 | Chun | H04W 72/21 |
| 2019/0123991 | A1 | 4/2019 | Suh et al. | |
| 2019/0215037 | A1 | 7/2019 | Seok et al. | |
| 2020/0059808 | A1* | 2/2020 | Lim | H04W 72/04 |
| 2020/0112350 | A1 | 4/2020 | Yang et al. | |
| 2020/0274588 | A1 | 8/2020 | Jiang et al. | |
| 2020/0336176 | A1 | 10/2020 | Seok et al. | |
| 2022/0030604 | A1* | 1/2022 | Noh | H04W 72/04 |

OTHER PUBLICATIONS 802.11-20/1672r0, UL Beamforming for TB PPDUs in 11be, Huawei.
802.11-20/1375r1 EHT NLTF Design, NXP.
802.11-20/1469r0 EHT Sounding Discussion, NXP.
IEEE P802.11ax™/D6.1, Part 11: Wireless LAN Medium Access Control (MAC) and Physical Layer (PHY) Specifications.
Extended Search Report dated Apr. 26, 2022 issued in corresponding European patent application No. 21208193.9.

\* cited by examiner

| Trigger Type Subfield Value | Trigger Frame Variant |
|---|---|
| 0 | Basic |
| 1 | Beamforming Report Poll (BFRP) |
| 2 | BR-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8 | Beamforming Sounding NDP Poll (BSNP) |
| 9 | Uplink Beamforming (ULBF) |
| 10-15 | Reserved |

FIG. 15

| Order | Information |
|---|---|
| 1 | Category |
| 2 | EHT Action |
| 3 | EHT UL BF MIMO Control for STA1 |
| 4 | EHT UL BF Compressed Beamforming Report for STA1 |
| 5 | EHT UL BF MIMO Control for STA2 |
| 6 | EHT UL BF Compressed Beamforming Report for STA2 |
| ⋮ | ⋮ |
| 2n+1 | EHT UL BF MIMO Control for STAn |
| 2n+2 | EHT UL BF Compressed Beamforming Report for STAn |

APPARATUS AND METHOD OF UPLINK BEAMFORMING IN WIRELESS LOCAL AREA NETWORK SYSTEM

CROSS-REFERENCE TO RELATED APPLICATIONS

This application is based on and claims priority under 35 U.S.C. § 119 to Korean Patent Application No. 10-2020-0155426, filed on Nov. 19, 2020, in the Korean Intellectual Property Office, Korean Patent Application No. 10-2021-0044301, filed on Apr. 5, 2021, in the Korean Intellectual Property Office and Korean Patent Application No. 10-2021-0052529, filed on Apr. 22, 2021, in the Korean Intellectual Property Office, the disclosures of which are incorporated by reference herein in their entireties.

BACKGROUND

The inventive concepts relate to wireless communication, and more particularly, to an apparatus and method for uplink beamforming in a wireless local area network (WLAN) system.

As an example of wireless communication, a WLAN is a technology for connecting two or more devices to each other using a wireless signal transmission method, and the WLAN technology may be based on the institute of electrical and electronics engineers (IEEE) 802.11 standard. The 802.11 standard has evolved into 802.11b, 802.11a, 802.11g, 802.11n, 802.11ac, and 802.11ax, and may support a transmission rate of up to 1 Gbyte/s based on orthogonal frequency-division multiplexing (OFDM) technology.

In 802.11ac, data may be simultaneously or contemporaneously transmitted to multiple users through multiple-user multiple-input multi-output (MU-MIMO) technology. In 802.11ax, referred to as high efficiency (HE), multiple access is implemented by applying not only the MU-MIMO technology but also orthogonal frequency-division multiple access (OFDMA) technology to divide and provide available subcarriers to users. Through this, a WLAN system to which 802.11ax is applied may effectively support communication in dense areas and outdoors.

In 802.11be, referred to as extremely high throughput (EHT), 6 GHz unlicensed frequency band support, bandwidth utilization of up to 320 MHz per channel, introduction of hybrid automatic repeat and request (HARD), support up to 16×16 MIMO, etc. are to be implemented. Through this, a next-generation WLAN system is expected to effectively support low latency and high-speed transmission like new radio (NR), which is 5G technology.

SUMMARY

The inventive concepts provide an apparatus and method for implementing uplink beamforming in a WLAN system.

According to an aspect of the inventive concepts, there is provided a wireless communication method by a first device, the method including: providing a first trigger frame to at least one second device, the first trigger frame requesting at least one sounding null data packet (NDP), providing a feedback frame to the at least one second device, the feedback frame including feedback information generated based on the at least one sounding NDP, and providing a second trigger frame to the at least one second device, the second trigger frame requesting at least one beamformed physical layer protocol data unit (PPDU), each of the first trigger frame and the feedback frame including a sounding dialog token number field having a sounding sequence number.

According to an aspect of the inventive concepts, there is provided a first device including: a transceiver; and processing circuitry configured to transmit a first trigger frame to at least one second device through the transceiver, the first trigger frame requesting at least one sounding null data packet (NDP), transmit a feedback frame to the at least one second device through the transceiver, the feedback frame including feedback information generated based on the at least one sounding NDP, and transmit a second trigger frame to the at least one second device through the transceiver, the second trigger frame requesting at least one beamformed physical layer protocol data unit (PPDU), each of the first trigger frame and the feedback frame including a sounding dialog token number field having a sounding sequence number.

According to an aspect of the inventive concepts, there is provided a wireless communication method by a second device, the method including: transmitting a sounding null data packet (NDP) to a first device in response to receiving a first trigger frame from the first device, generating a beam steering matrix based on feedback information included in a feedback frame received from the first device, and transmitting a beamformed physical layer protocol data unit (PPDU) to the first device based on the beam steering matrix in response to receiving a second trigger frame from the first device, each of the first trigger frame and the feedback frame including a sounding dialog token number field having a sounding sequence number.

BRIEF DESCRIPTION OF THE DRAWINGS

Embodiments of the inventive concepts will be more clearly understood from the following detailed description taken in conjunction with the accompanying drawings in which:

FIG. 15 is a view of a feedback frame according to embodiments;

DETAILED DESCRIPTION

Figure 1:
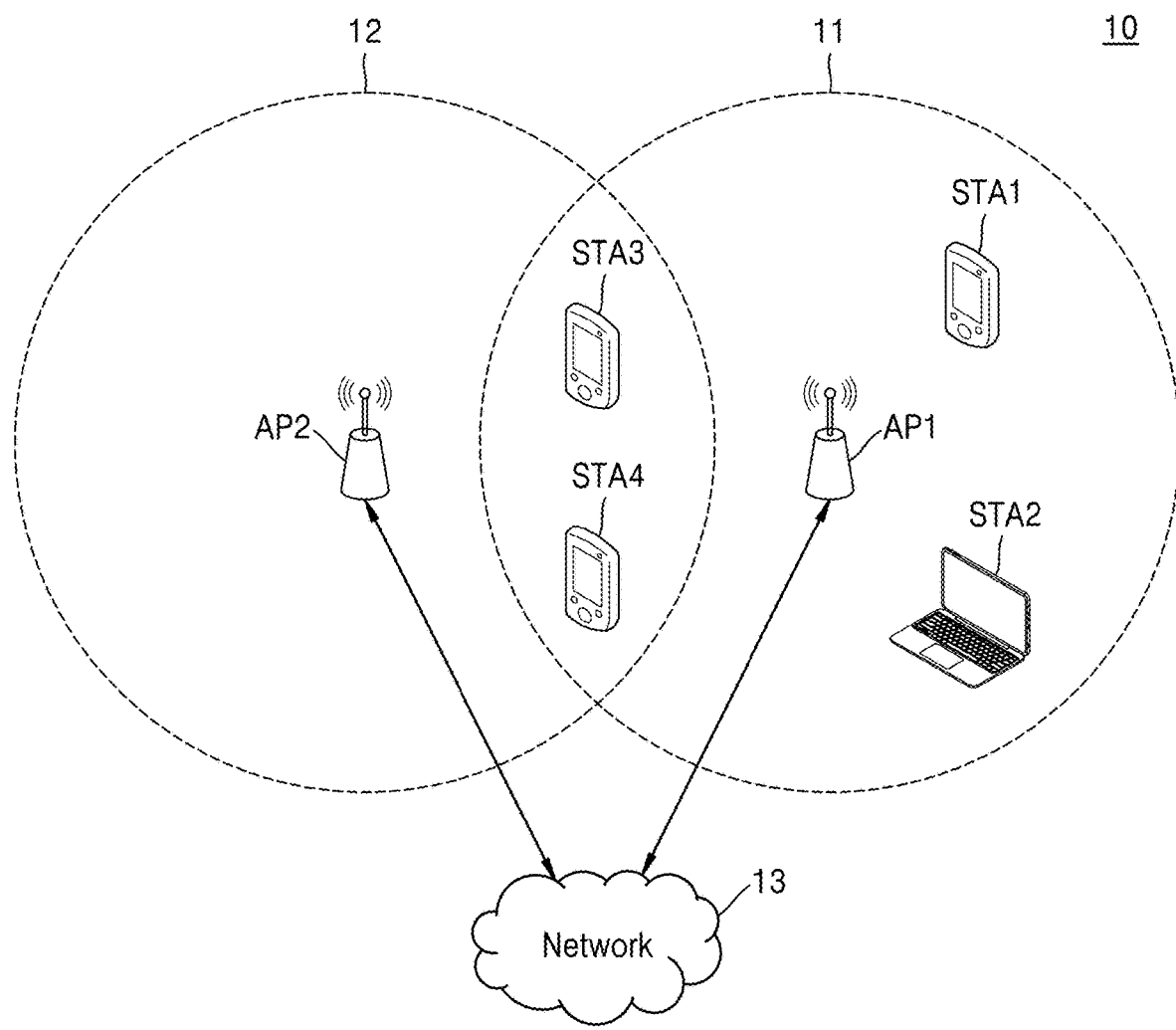
FIG. 1 is a view of a wireless communication system according to embodiments.

FIG. 1 is a view of a wireless communication system 10 according to embodiments. In more detail, FIG. 1 shows a wireless local area network (WLAN) system as an example of the wireless communication system 10.

In describing embodiments of the disclosure in detail, the focus will mainly be on orthogonal frequency-division multiplexing (OFDM) or orthogonal frequency-division multiple access (OFDMA) based wireless communication systems, in particular, IEEE 802.11 standards, but the main gist of the disclosure is applicable to other communication systems (e.g., a cellular communication system such as long term evolution (LTE), LTE-advanced (LTE-A), new radio (NR), wireless broadband (WiBro), a global system for mobile communication (GSM), or a short-range communication system such as Bluetooth and near field communication (NFC)) with a similar technical background and channel form with slight modifications without departing from the scope of the disclosure, as may be determined by one of ordinary skill in the art.

In addition, various functions described later below may be implemented or supported by artificial intelligence technology or one or more computer programs, and each of the programs includes computer-readable program code and is embodied in a non-transitory computer-readable recording medium. The terms "application" and "program" refer to one or more computer programs, software components, instruction sets, procedures, functions, objects, classes, instances, associated data, or portions thereof suitable for implementation of suitable computer-readable program code. The term "computer-readable program code" includes computer code of any type, including source code, object code, and executable code. The term "computer-readable recording medium" includes any tangible medium that may be accessed by a computer, such as read only memory (ROM), random access memory (RAM), a hard disk drive, a compact disk (CD), a digital video disk (DVD), or any other type of a memory. A "non-transitory" computer-readable recording medium excludes wired, wireless, optical, or other communication links that transmit transitory electrical or other signals. The non-transitory computer-readable recording medium includes media in which data may be permanently stored, and media in which data may be stored and later overwritten, such as a rewritable optical disk or a removable memory device.

In embodiments of the disclosure described later below, a hardware approach is described as an example. However, because embodiments of the disclosure include a technology using both hardware and software, embodiments of the disclosure do not exclude a software-based approach.

In addition, terms that refer to control information, terms that refer to an entry, terms that refer to network entities, terms that refer to messages, and terms that refer to components of an apparatus, which are used in the following description, are exemplified for convenience of description. Accordingly, the disclosure is not limited to the terms described below, and other terms having equivalent technical meanings may be used.

Referring to FIG. 1, the wireless communication system 10 may include first and second access points AP1 and AP2, a first station STA1, a second station STA2, a third station STA3, and/or a fourth station STA4. The first and second access points AP1 and AP2 may access a network 13 including the Internet, an Internet protocol (IP) network, or any other network. The first access point AP1 may provide the first station STA1, the second station STA2, the third station STA3, and the fourth station STA4 with access to the network 13 within a first coverage area 11, and the second access point AP2 may also provide the third and fourth stations STA3 and STA4 with access to the network 13 within a second coverage area 12. In embodiments, the first and second access points AP1 and AP2 may communicate with at least one of the first station STA1, the second station STA2, the third station STA3, and/or the fourth station STA4 based on wireless fidelity (WiFi) or any other WLAN access technology.

An access point may be referred to as a router, a gateway, and the like, and a station may be referred to as a mobile station, a subscriber station, a terminal, a mobile terminal, a wireless terminal, user equipment, a user, and the like. The station may be a mobile device, such as a mobile phone, a laptop computer, a wearable device, or the like, or a stationary device, such as a desktop computer, a smart TV, or the like. Herein, an access point may be referred to as a first apparatus, and a station may be referred to as a second apparatus. Examples of an access point and station will be described below with reference to FIG. 21.

The access point may allocate at least one resource unit (RU) to at least one station. The access point may transmit data through at least one allocated resource unit, and at least one station may receive data through at least one allocated resource unit. In 802.11ax (hereafter HE), an access point may allocate only a single resource unit to at least one station, while in 802.11be (hereafter EHT) or next-generation IEEE 802.11 standards (hereafter EHT+), an access point may allocate a multi-resource unit (MRU) including two or more resource units to at least one station. For example, the first access point AP1 may allocate the MRU to at least one of the first station STA1, the second station STA2, the third station STA3, and/or the fourth station STA4, and may transmit data through the allocated MRU.

In embodiments, an access point and a station may communicate with each other based on beamforming. Single-user beamforming may improve transmission and/or reception performance of a single user, and multi-user beamforming may improve transmission and/or reception performance of multiple users by eliminating or reducing interference between multiple users. For example, as described below with reference to FIG. 3, an access point may communicate with at least one station based on downlink beamforming. In addition, as described later with reference to FIGS. 4A and 4B, an access point may communicate with at least one station based on uplink beamforming. The access point and the station may perform channel sounding for beamforming, and the channel sounding may be based on a sounding protocol. The sounding protocol may refer to a procedure for a beamformer to receive channel state information as feedback from a beamformee. As described later below with reference to the drawings, in a WLAN system, uplink beamforming as well as downlink beamforming may be implemented, and thus, the efficiency and throughput of uplink transmission may be increased. Because the HE may only support downlink beamforming, embodiments are described below with reference to an EHT mainly, but it will be understood that embodiments may also be applied to an EHT+.

Figure 2:
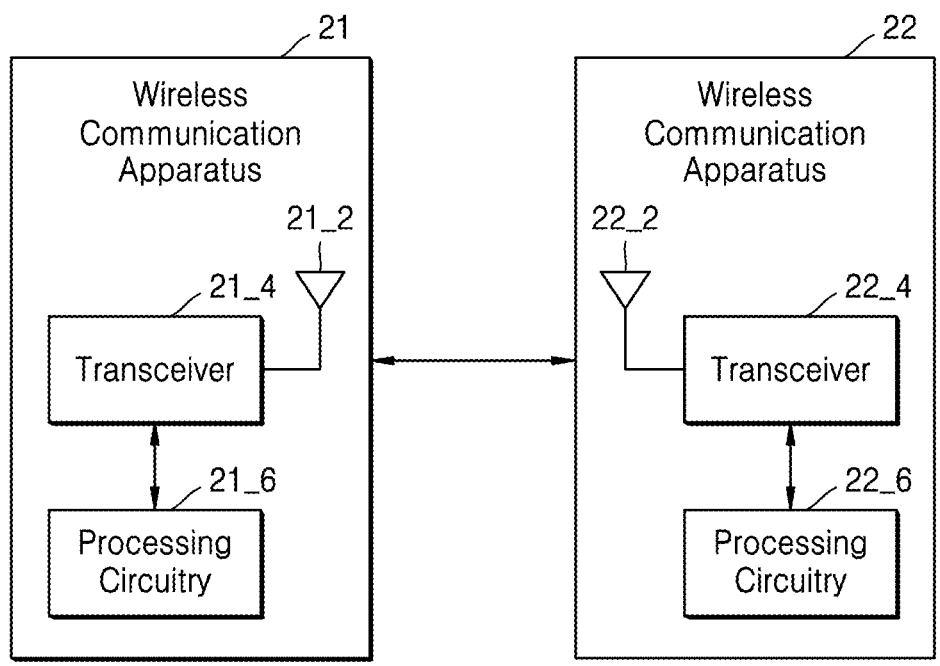
FIG. 2 is a block diagram of a wireless communication system according to embodiments.

FIG. 2 is a block diagram of a wireless communication system 20 according to embodiments. In more detail, the block diagram of FIG. 2 shows a first wireless communication apparatus 21 and a second wireless communication apparatus 22 that communicate with each other in the wireless communication system 20. Each of the first wireless communication apparatus 21 and the second wireless communication apparatus 22 of FIG. 2 may be any device that communicates in the wireless communication system 20 and may be referred to as an apparatus for wireless communication. In embodiments, each of the first wireless communication apparatus 21 and the second wireless communication apparatus 22 may be an access point or station of a WLAN system.

Referring to FIG. 2, the first wireless communication apparatus 21 may include an antenna 21_2, a transceiver 21_4, and/or processing circuitry 21_6. In embodiments, the antenna 21_2, the transceiver 21_4, and the processing circuitry 21_6 may be included in one package or may be included in different packages, respectively. The second wireless communication apparatus 22 may also include an antenna 22_2, a transceiver 22_4, and/or processing circuitry 22_6. Hereinafter, redundant descriptions of the first wireless communication apparatus 21 and the second wireless communication apparatus 22 will be omitted. According to embodiments, the antenna 21_2, the transceiver 21_4, and/or the processing circuitry 21_6 may be the same as or similar to the antenna 22_2, the transceiver 22_4, and/or the processing circuitry 22_6, respectively.

The antenna 21_2 may receive a signal from the second wireless communication apparatus 22 and provide the signal to the transceiver 21_4, and may transmit the signal provided from the transceiver 21_4 to the second wireless communication apparatus 22. In embodiments, the antenna 21_2 may include a plurality of antennas for multiple-input multiple-output (MIMO). In addition, in embodiments, the antenna 21_2 may include a phased array for beamforming.

The transceiver 21_4 may process a signal received from the second wireless communication apparatus 22 through the antenna 21_2 and provide the processed signal to the processing circuitry 21_6. In addition, the transceiver 21_4 may process a signal provided from the processing circuitry 21_6 and output the processed signal through the antenna 21_2. In embodiments, the transceiver 21_4 may include an analog circuit such as a low noise amplifier, a mixer, a filter, a power amplifier, and/or an oscillator. In embodiments, the transceiver 21_4 may process a signal received from the antenna 21_2 and/or a signal received from the processing circuitry 21_6 based on the control of the processing circuitry 21_6.

The processing circuitry 21_6 may extract information transmitted by the second wireless communication apparatus 22 by processing a signal received from the transceiver 21_4. For example, the processing circuitry 21_6 may extract information by demodulating and/or decoding the signal received from the transceiver 21_4. In addition, the processing circuitry 21_6 may generate a signal including information to be transmitted to the second wireless communication apparatus 22 and provide the signal to the transceiver 21_4. For example, the processing circuitry 21_6 may provide a signal generated by encoding and/or modulating data to be transmitted to the second wireless communication apparatus 22 to the transceiver 21_4. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. For example, in embodiments, the processing circuitry 21_6 may include a programmable component such as a CPU, a digital signal processor (DSP), and the like, may include a reconfigurable component, such as an FPGA, and the like, or may include a component that provides a fixed function, such as an intellectual property (IP) core. In embodiments, the processing circuitry 21_6 may include or access a memory that stores data and/or a series of instructions.

Herein, the transceiver 21_4 and/or the processing circuitry 21_6 performing the operations may simply be referred to as the first wireless communication apparatus 21 performing corresponding operations. Accordingly, operations performed by an access point may be performed by a transceiver and/or processing circuitry included in the access point, and operations performed by a station may be performed by a transceiver and/or processing circuitry included in the station.

Figure 3:
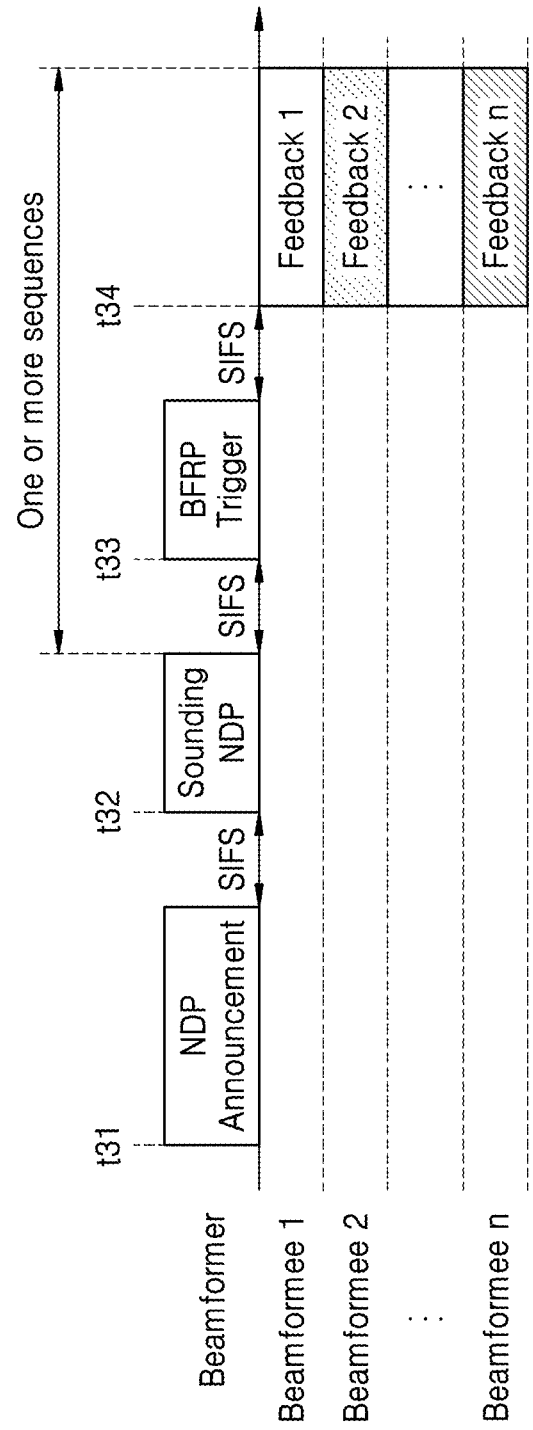
FIG. 3 is a timing diagram illustrating channel sounding according to embodiments.

FIG. 3 is a timing diagram illustrating channel sounding according to embodiments. In more detail, the timing diagram of FIG. 3 shows channel sounding performed by a beamformer and first to $n^{th}$ beamformees (n is an integer greater than 0) for downlink beamforming. In FIG. 3, the beamformer may be an access point, and each of the first to $n^{th}$ beamformees may be a station. In embodiments, the first to $n^{th}$ beamformees of FIG. 3 may support different protocol standards, respectively.

Referring to FIG. 3, at time t31, the beamformer may provide a null data packet or null data PPDU (NDP) announcement frame to the first to $n^{th}$ beamformees. For example, an access point may provide an NDP announcement frame indicating transmission of a sounding NDP to the first to $n^{th}$ beamformees to obtain downlink channel state information. The NDP announcement frame may be a control frame, and the first to $n^{th}$ beamformees may prepare to receive the sounding NDP based on the NDP announcement frame.

At time t32, the beamformer may transmit the sounding NDP to the first to $n^{th}$ beamformees. For example, as shown in FIG. 3, after providing the NDP announcement frame to the first to $n^{th}$ beamformees, the access point may transmit the sounding NDP to the first to $n^{th}$ beamformees after a short interframe space (SIFS) time. The first to $n^{th}$ beamformees may estimate a downlink channel based on the sounding NDP, and may generate information about a channel state, that is, feedback information. In embodiments, an aggregated PPDU including NDPs may be provided to the first to $n^{th}$ beamformees.

At time t33, the beamformer may provide a beamforming report poll (BFRP) trigger frame to the first to $n^{th}$ beamformees. For example, after transmitting the sounding NDP to the first to $n^{th}$ beamformees, the access point may provide a BFRP trigger frame for triggering uplink transmission of the first to $n^{th}$ beamformees to the first to $n^{th}$ beamformees. The BFRP trigger frame may include information used by the first to $n^{th}$ beamformees to provide channel state information as feedback to the beamformer, that is, the access point. For example, the BFRP trigger frame may include information about resources to be used in uplink transmission.

At time t34, the first to $n^{th}$ beamformees may provide first to $n^{th}$ feedback frames to the beamformer. For example, each of the first to $n^{th}$ beamformees may provide a compressed beamforming/channel quality indicator (CQI) frame including channel state information generated by channel estimation to the beamformer. The compressed beamforming/CQI frame may include information about a signal-to-noise ratio (SNR) for a space-time stream and a compressed beamforming feedback matrix for a subcarrier.

Figure 4A:
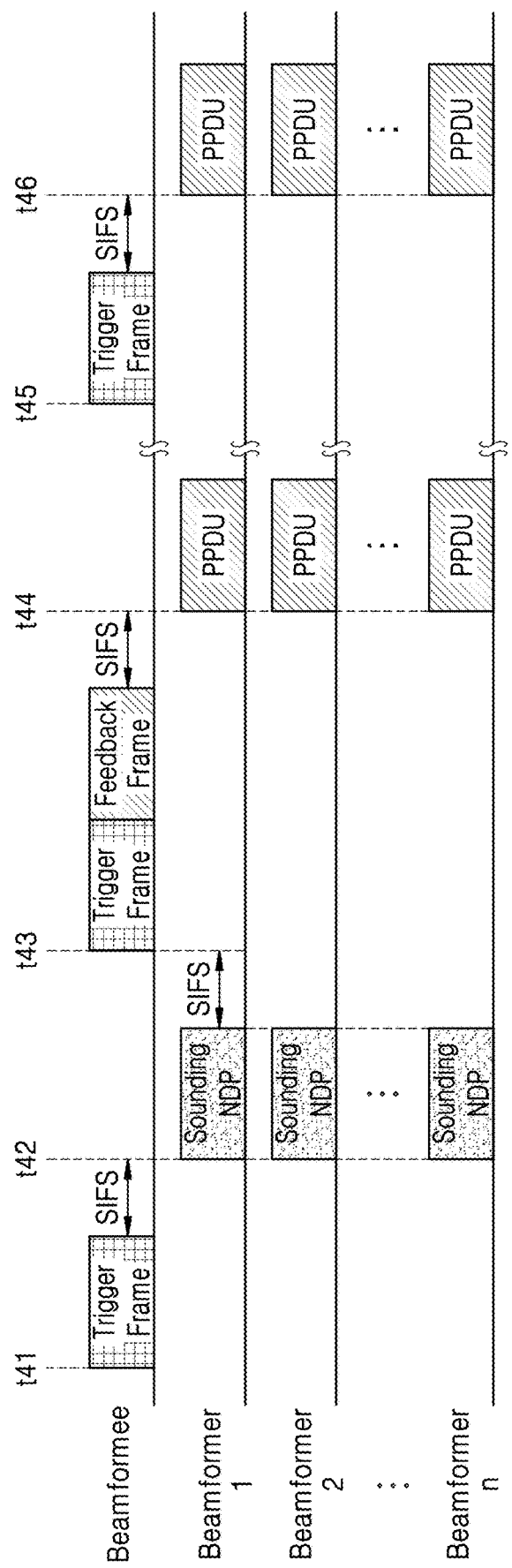
FIGS. 4A and 4B are timing diagrams illustrating channel sounding according to embodiments.
Figure 4B:
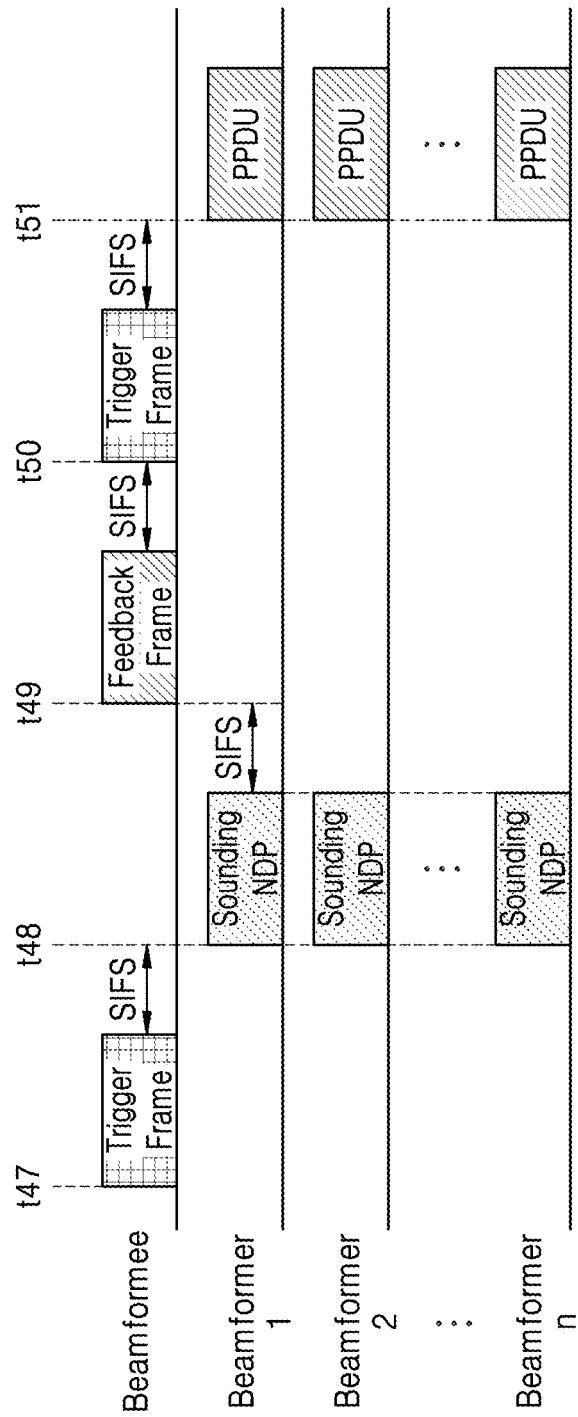

FIGS. 4A and 4B are timing diagrams illustrating channel sounding according to embodiments. In more detail, the timing diagrams of FIGS. 4A and 4B show channel sounding performed by a beamformee and first to $n^{th}$ beamformers (n is an integer greater than 0) for uplink beamforming. In FIGS. 4A and 4B, the beamformee may be an access point, and each of the first to $n^{th}$ beamformers may be a station. Hereinafter, redundant descriptions of FIGS. 4A and 4B will not be given herein.

Referring to FIG. 4A, at time t41, the beamformee may provide a trigger frame for requesting a sounding NDP to the first to $n^{th}$ beamformers. For example, the beamformee may provide a trigger frame for requesting a sounding NDP to the first to $n^{th}$ beamformers to obtain uplink channel state information. Herein, a trigger frame by which a beamformee requests a sounding NDP from a beamformer in uplink beamforming may be referred to as a first trigger frame, a beamforming sounding NDP poll (BSNP) trigger frame, a sounding NDP trigger frame, or a sounding trigger frame.

At time t42, each of the first to $n^{th}$ beamformers may provide a sounding NDP to the beamformee. For example, as shown in FIG. 4A, each of the first to $n^{th}$ beamformers may transmit a sounding NDP after an SIFS time to the beamformee after the first trigger frame is received. The beamformee may estimate an uplink channel based on the sounding NDP received from the first to $n^{th}$ beamformers and may generate information about a channel state.

At time t43, the beamformee may provide a feedback frame and a trigger frame for requesting a beamformed PPDU to the first to $n^{th}$ beamformers. For example, as shown in FIG. 4A, the beamformee may transmit a trigger frame and a feedback frame to the first to $n^{th}$ beamformers after an SIFS time after receiving a sounding NDP. In embodiments, the beamformee may provide a compressed beamforming frame including channel state information generated by channel estimation as a feedback frame to the first to $n^{th}$ beamformers, and the feedback frame may be referred to as an uplink beamforming compressed beamforming frame (ULBF CBF). Herein, a trigger frame by which a beamformee requests a beamformed PPDU from a beamformer in uplink beamforming may be referred to as a second trigger frame, an uplink beamforming trigger frame.

In embodiments, the second trigger frame and the feedback frame may be provided to the first to $n^{th}$ beamformers through one PPDU. For example, the second trigger frame and the feedback frame may be included in an aggregated message access control protocol data unit (A-MPDU). As described later below, in embodiments, the second trigger frame and the feedback frame may be included in independent PPDUs, respectively.

At time t44, each of the first to $n^{th}$ beamformers may transmit a beamformed PPDU to the beamformee. For example, as shown in FIG. 4A, each of the first to $n^{th}$ beamformers may transmit a beamformed PPDU after an SIFS time to the beamformee after the second trigger frame is received.

At time t45, the beamformee may provide the second trigger frame to the first to $n^{th}$ beamformers. For example, the beamformee may provide the second trigger frame to the first to $n^{th}$ beamformers to request a beamformed PPDU based on a beam steering matrix generated based on the feedback frame provided to the first to $n^{th}$ beamformers at time t43.

At time t46, each of the first to $n^{th}$ beamformers may transmit the beamformed PPDU to the beamformee. For example, as shown in FIG. 4A, each of the first to $n^{th}$ beamformers may transmit a beamformed PPDU after an SIFS time to the beamformee after the second trigger frame is received.

Referring to FIG. 4B, at time t47, the beamformee may provide the first trigger frame to the first to $n^{th}$ beamformers. At time t48, each of the first to $n^{th}$ beamformers may provide a sounding NDP to the beamformee in response to the first trigger frame. At time t49, the beamformee may provide a feedback frame to the first through $n^{th}$ beamformers.

At time t50, the beamformee may provide the second trigger frame to the first to $n^{th}$ beamformers. For example, as shown in FIG. 4B, after providing a feedback frame to the first to $n^{th}$ beamformers, the beamformee may transmit the second trigger frame to the first to $n^{th}$ beamformers after an SIFS time. In embodiments, after providing a feedback frame to the first to $n^{th}$ beamformers, the beamformee may transmit the second trigger frame to the first to $n^{th}$ beamformers after a time longer than the SIFS time such that each of the first to $n^{th}$ beamformers is given sufficient time to generate a beamforming steering matrix based on feedback information included in the feedback frame.

At time t51, each of the first to $n^{th}$ beamformers may transmit the beamformed PPDU to the beamformee. For example, as shown in FIG. 4B, each of the first to $n^{th}$ beamformers may transmit a beamformed PPDU after an SIFS time to the beamformee after the second trigger frame is received.

As described above with reference to FIGS. 4A and 4B, a sounding protocol for uplink beamforming may be different from the sounding protocol for downlink beamforming described above with reference to FIG. 3. Accordingly, the first trigger frame, the sounding NDP, the feedback frame, and the second trigger frame shown in FIGS. 4A and 4B may be new, and examples of the first trigger frame, the sounding NDP, the feedback frame, and the second trigger frame will be described later below with reference to the drawings.

Figure 5:
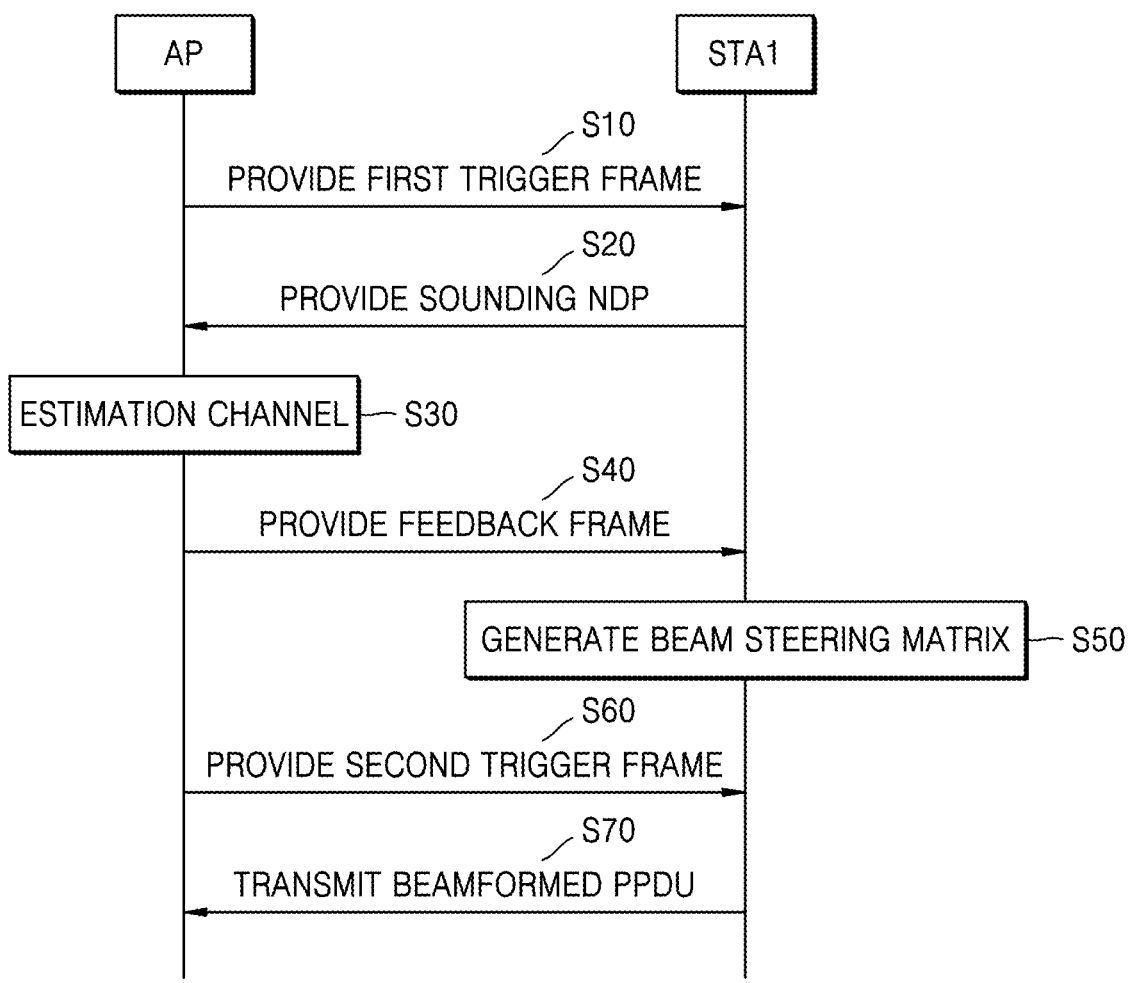
FIG. 5 is a message diagram illustrating a method for uplink beamforming according to embodiments.

FIG. 5 is a message diagram illustrating a method for uplink beamforming according to embodiments. In more detail, the message diagram of FIG. 5 shows operations of an access point AP serving as a beamformee and the first station STA1 serving as a beamformer in uplink beamforming.

Referring to FIG. 5, in operation S10, the access point AP may provide a first trigger frame to the first station STA1. As described above with reference to FIGS. 4A and 4B, the first trigger frame may request a sounding NDP from the first station STA1. For example, the access point AP may transmit a PPDU including a first trigger frame to the first station STA1.

In operation S20, the first station STA1 may provide a sounding NDP to the access point AP. For example, the first station STA1 may transmit a sounding NDP to the access point AP in response to the first trigger frame received from the access point AP in operation S10. An example of a sounding NDP will be described later with reference to FIG. 14.

In operation S30, the access point AP may perform channel estimation. For example, the access point AP may estimate an uplink channel based on the sounding NDP received from the first station STA1 in operation S20. The access point AP may generate feedback information, for example, information about an SNR for a space-time stream (e.g., using frequency-time resources) and a compressed beamforming feedback matrix for a subcarrier based on the estimated uplink channel.

In operation S40, the access point AP may provide a feedback frame to the first station STA1. For example, the access point AP may generate a feedback frame including feedback information generated by channel estimation in operation S30, and may transmit a PPDU including the feedback frame to the first station STA1. In embodiments, the access point AP may transmit a compressed beamforming frame as a feedback frame to the first station STA1.

In operation S50, the first station STA1 may generate a beam steering matrix. For example, the first station STA1 may generate a beam steering matrix to be used for beamforming based on feedback information included in the feedback frame received from the access point AP in operation S40.

In operation S60, the access point AP may provide a second trigger frame to the first station STA1. As described above with reference to FIGS. 4A and 4B, the second trigger frame may request a beamformed PPDU from the first station STA1. For example, the access point AP may transmit a PPDU including a second trigger frame to the first station STA1.

In operation S70, the first station STA1 may transmit a beamformed PPDU to the access point AP. For example, the first station STA1 may transmit a beamformed PPDU to the access point AP based on the beam steering matrix generated in operation S50. According to embodiments, the first station STA1 may generate a communication signal, generate a PPDU corresponding to the communication signal, and transmit the generated PPDU as a beamformed PPDU based on the beam steering matrix. According to embodiments, the access point AP may receive the beamformed PPDU and obtain the communication signal from the beamformed PPDU. According to embodiments, in addition to performing beamforming on uplink communications between the access point AP and the first station STA1, beamforming may also be performed over downlink communications between the access point AP and the first station STA1. For example, according to embodiments, beamforming may also be performed over downlink communications between the access point AP and the first station STA1 using known protocols and procedures.

In embodiments, each of the first trigger frame, the feedback frame, and the second trigger frame may include a field having a sounding sequence number. For example, each of the first trigger frame, the feedback frame, and the second trigger frame may include a sounding dialog token number field (or subfield) having a sounding sequence number. The access point AP may sequentially provide a first trigger frame, a feedback frame, and a second trigger frame all having the same sequence number (or similar sequence numbers) (e.g., matching numbers) to the first station STA1, and the first station STA1 may transmit a sounding NDP and a beamformed PPDU to the access point AP based on the first trigger frame, the feedback frame, and the second trigger frame all having the same number (or similar numbers) (e.g., matching numbers).

Figure 6:
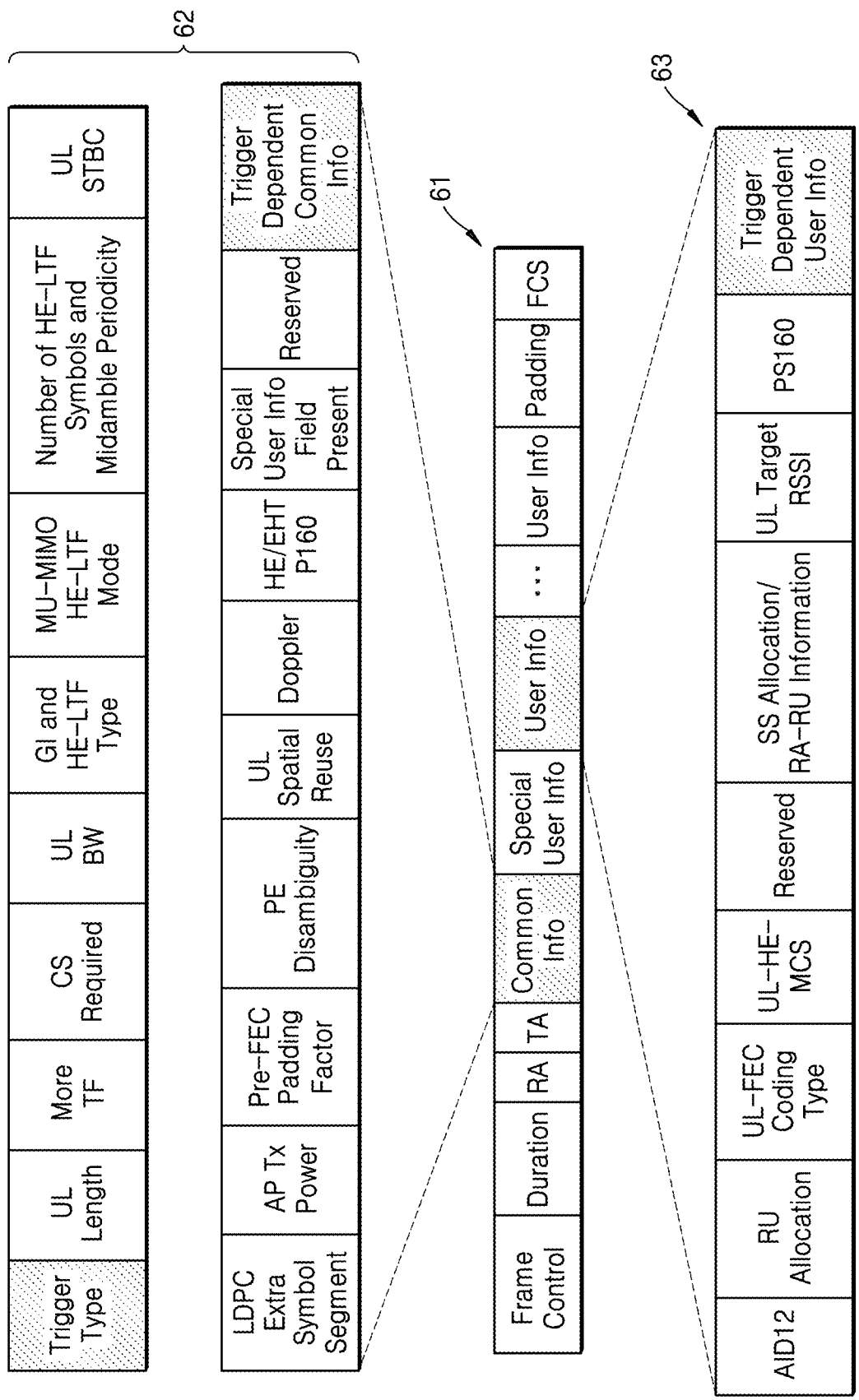
FIG. 6 is a view of a trigger frame according to embodiments.

FIG. 6 is a view of a trigger frame 61 according to embodiments. In more detail, FIG. 6 shows the trigger frame 61, a common information field 62 included in the trigger frame 61, and a user information field 63. Hereinafter, FIG. 6 will be described with reference to FIG. 5.

The trigger frame 61 may be used for transmission of a trigger-based (TB) PPDU. For example, the access point AP may set an uplink bandwidth through the trigger frame 61 and may allocate a resource unit RU for uplink multi-user MU transmission. In embodiments, a trigger frame may include (e.g., may be implemented as) a media access control (MAC) frame and may be included in a PPDU (e.g., a data field of the PPDU). In embodiments, a trigger frame may be included in a PPDU dedicated to the trigger frame.

Referring to FIG. 6, a trigger frame may include a frame control field, a duration field, an RA field, a TA field, a common information field, a special user information field, at least one user information field, a padding field, and/or a frame check sequence (FCS) field. The frame control field may include information about the version of an MAC protocol and other additional control information. The duration field may include time information for setting a network allocation vector (NAV) or information about an identifier of a terminal (e.g., an association identifier (AID)). The RA field may include address information of a receiver (e.g., STA1) of the trigger frame, and may be omitted. The TA field may include address information of a transmitter (e.g., AP) of the trigger frame. The common information field 62 may include control information commonly applied to receivers receiving the trigger frame. A special user information field may be ignored in legacy protocol standards (e.g., HE) and may be omitted from the trigger frame 61. In embodiments, a special user information field may be used in a sounding protocol for uplink beamforming, and examples of the special user information field will be described later with reference to FIGS. 13A and 13B. At least one user information field may respectively correspond to at least one receiver receiving the trigger frame 61 and may follow the special user information field in the trigger frame 61. Each of the common information field 62 and the user information field 63 may include a plurality of subfields, as shown in FIG. 6, and may include a plurality of subfields defined by EHT in embodiments.

From among a plurality of subfields included in the common information field 62, a trigger-type subfield may indicate the type of a trigger frame, and a receiver may identify a trigger frame variant based on the trigger-type subfield. The trigger frame 61 may include a trigger-dependent subfield according to the trigger frame variant defined by the trigger-type subfield. According to the trigger frame variant, as shown in FIG. 6, a trigger-dependent common information subfield may be included in the common information field 62, or the trigger-dependent common information subfield may be omitted. In addition, according to the trigger frame variant, as shown in FIG. 6, a trigger-dependent user information field may be included in the user information field 63, or the trigger-dependent user information field may be omitted. For example, when a trigger-type subfield has a value corresponding to a BFRP, a user information field may include a feedback segment retransmission bitmap subfield as a trigger-dependent user information subfield.

In embodiments, a trigger-type subfield may have a value indicating a first trigger frame and/or a second trigger frame for uplink beamforming. Accordingly, a receiver may identify the first trigger frame and/or the second trigger frame based on the trigger-type subfield. In addition, the first trigger frame and/or the second trigger frame may include a trigger-dependent subfield, and the trigger-dependent subfield may include the sounding sequence number described above with reference to FIG. 5.

Figure 7:
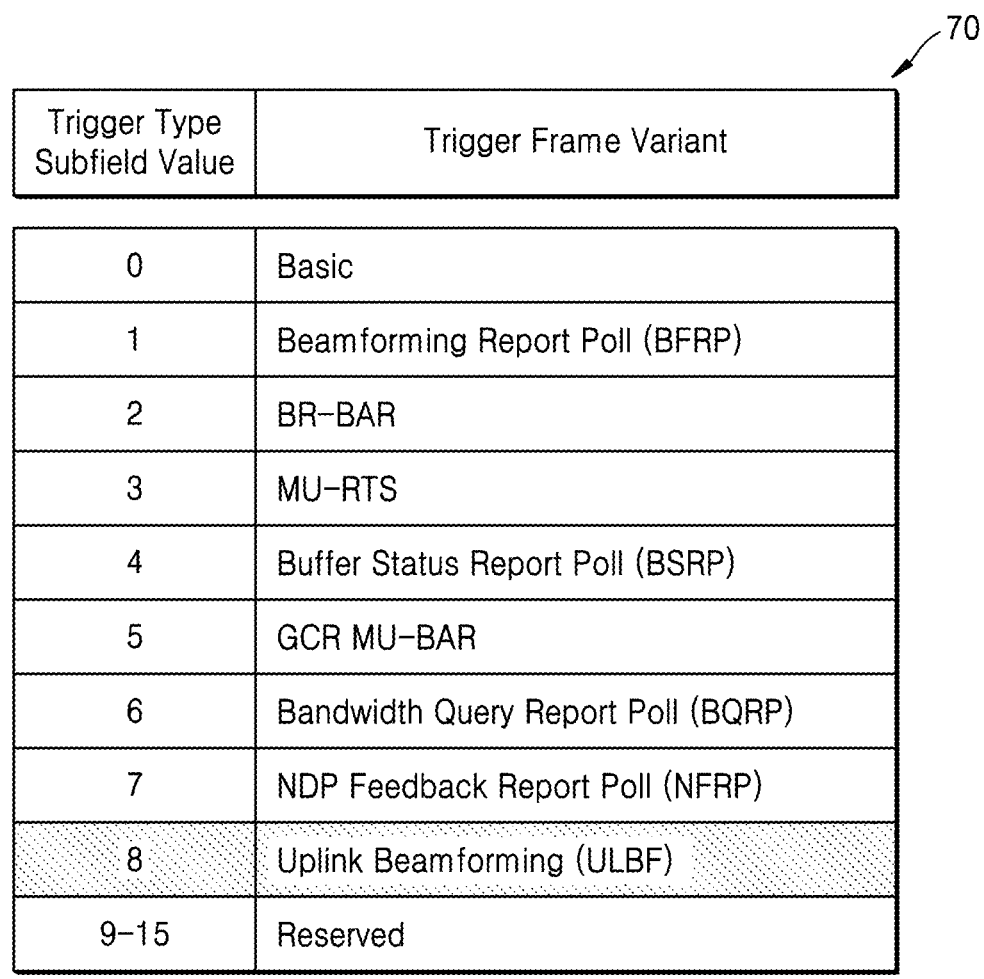
FIG. 7 is a view illustrating encoding of a trigger-type subfield according to embodiments.

FIG. 7 is a view illustrating encoding of a trigger-type subfield according to embodiments. In more detail, FIG. 7 shows table 70 defining encoding of the trigger-type subfield included in the common information field 62 of FIG. 6. As described above with reference to FIG. 6, the trigger-type subfield may have a value indicating a first trigger frame and/or a second trigger frame for uplink beamforming. Hereinafter, FIG. 7 will be described with reference to FIG. 5.

In embodiments, a first trigger frame and a second trigger frame may respectively include trigger-type subfields having the same value or similar values. For example, as shown in FIG. 7, a trigger-type subfield may have one of values from 0 to 8 corresponding to Basic, BFRP, BR-BAR, multi-user request to send (MU-RTS), Buffer Status Report Poll (BSRP), group case multi-user blockack request (GCR MU-BAR), Bandwidth Query Report Poll (BQRP), NDP Feedback Report Poll (NFRP), and ULBF, respectively. Accordingly, each of the first trigger frame and the second trigger frame may include a common information field including a trigger-type subfield having a value of 8. When a trigger-type subfield extracted from a trigger frame has a value of 8, the first station STA1 may identify the first trigger frame or the second trigger frame.

Figure 8A:
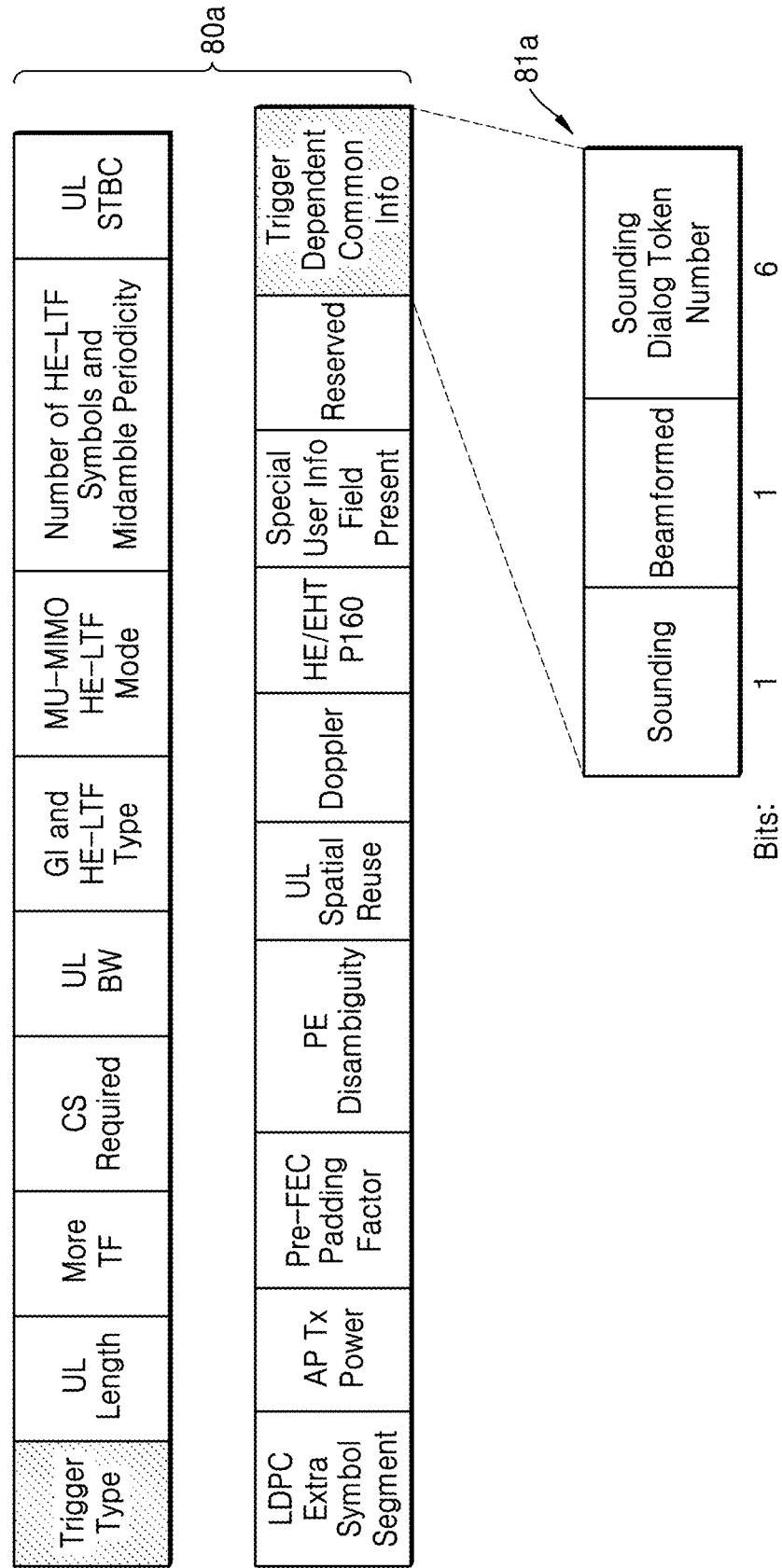
FIGS. 8A and 8B are views respectively illustrating a common information field and a user information field according to embodiments.
Figure 8B:
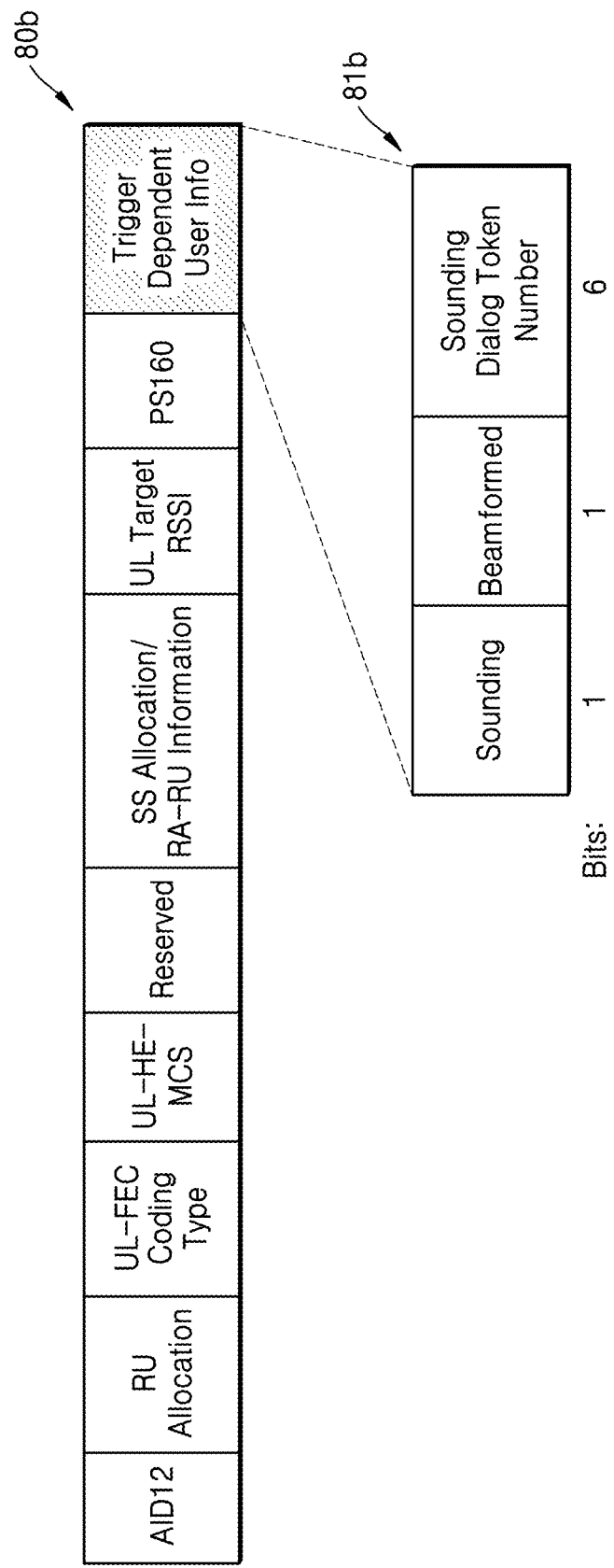

FIGS. 8A and 8B are views respectively illustrating a common information field 80a and a user information field 80b according to embodiments. In more detail, FIGS. 8A and 8B show a trigger-dependent common information subfield and a trigger-dependent user information subfield, respectively, when an encoded trigger-type subfield has a value (e.g., 8) corresponding to a first trigger frame or a second trigger frame, as described above with reference to FIG. 7. Hereinafter, FIGS. 8A and 8B will be described with reference to FIG. 7.

Referring to FIG. 8A, a first trigger frame and a second trigger frame may include the common information field 80a including a trigger-dependent common information subfield 81a, and the trigger-dependent common information subfield 81a may include a sounding dialog token number subfield. Accordingly, at least one beamformer corresponding to at least one user information field included in the first trigger frame or the second trigger frame may identify a common sounding sequence number.

In embodiments, the trigger-dependent common information subfield 81a may include at least one field for distinguishing a first trigger frame from a second trigger frame. As shown in FIG. 8A, the trigger-dependent common information subfield 81a may include a Sounding field and a Beamformed field, and the first trigger frame and the second trigger frame may include different values in the Sounding field and the Beamformed field, respectively. For example, a first trigger frame requesting a sounding NDP may include a Sounding subfield having 1 and a Beamformed subfield having 0 in the trigger-dependent common information subfield 81a, while a second trigger frame requesting a beamformed PPDU may include a Sounding subfield having 0 and a Beamformed subfield having 1 in the trigger-dependent common information subfield 81a. In embodiments, different from that shown in FIG. 8A, the trigger-dependent common information subfield 81a may include a single subfield of 1 bit to distinguish a first trigger frame from a second trigger frame.

Referring to FIG. 8B, the first trigger frame and the second trigger frame may include the user information field 80b including a trigger-dependent user information subfield 81b, and the trigger-dependent user information subfield 81b may include a sounding dialog token number subfield. Accordingly, a beamformer corresponding to a user information field included in each of the first trigger frame and the second trigger frame may identify its own sounding sequence number.

In embodiments, the trigger-dependent user information subfield 81b may include at least one subfield for distinguishing the first trigger frame from the second trigger frame. As shown in FIG. 8B, the trigger-dependent user information subfield 81b may include a Sounding subfield and a Beamformed subfield, and the first trigger frame and the second trigger frame may include different values in the Sounding subfield and the Beamformed subfield, respectively. For example, a first trigger frame requesting a sounding NDP may include a Sounding subfield having a value of 1 and a Beamformed subfield having a value of 0 in the trigger-dependent user information subfield 81b, while a second trigger frame requesting a beamformed PPDU may include a Sounding subfield having 0 and a Beamformed subfield having 1 in the trigger-dependent user information subfield 81b. In addition, the user information field 80b corresponding to a beamformer for which a beamformed PPDU is not requested may include a Sounding subfield having 0 and a Beamformed subfield having 0.

Figure 9:
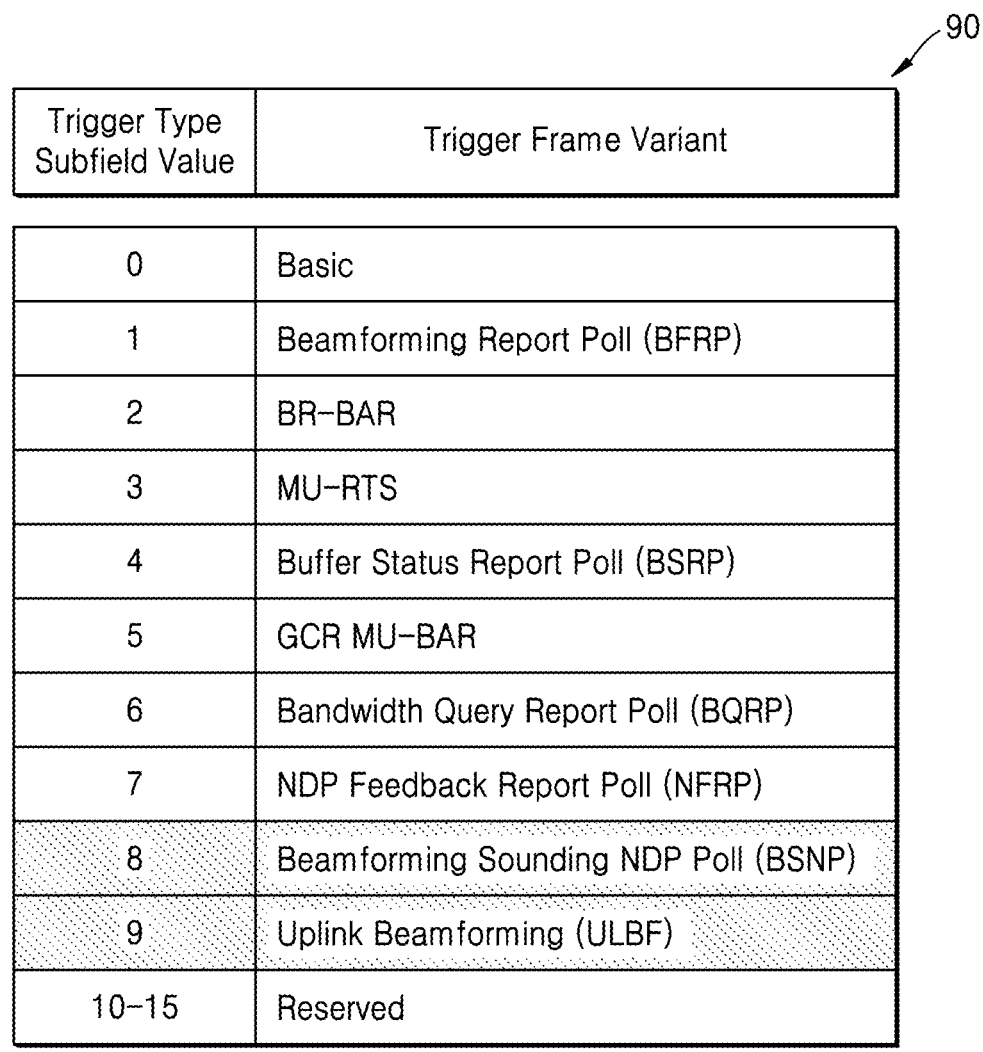
FIG. 9 is a view illustrating encoding of a trigger-type subfield according to embodiments.

FIG. 9 is a view illustrating encoding of a trigger-type subfield according to embodiments. In more detail, FIG. 9 shows table 90 defining encoding of the trigger-type subfield included in the common information field 62 of FIG. 6. As described above with reference to FIG. 6, the trigger-type subfield may have a value indicating a first trigger frame and/or a second trigger frame for uplink beamforming. Hereinafter, FIG. 9 will be described with reference to FIG. 5.

In embodiments, a first trigger frame and a second trigger frame may include trigger-type subfields having different values, respectively. For example, as shown in FIG. 9, a trigger-type subfield may have one of values from 0 to 9 corresponding to Basic, BFRP, BR-BAR, MU-RTS, BSRP, GCR MU-BAR, BQRP, NFRP, sounding NDP (SN) (e.g., BSNP), and ULBF, respectively. Accordingly, the first trigger frame may include a common information field including a trigger-type subfield having a value of 8, while the second trigger frame may include a common information field including a trigger-type subfield having a value of 9. Accordingly, the first station STA1 may identify the first trigger frame when a trigger-type subfield extracted from a trigger frame has a value of 8, and may identify the second trigger frame when a trigger-type subfield extracted from a trigger frame has a value of 9.

Figure 10A:
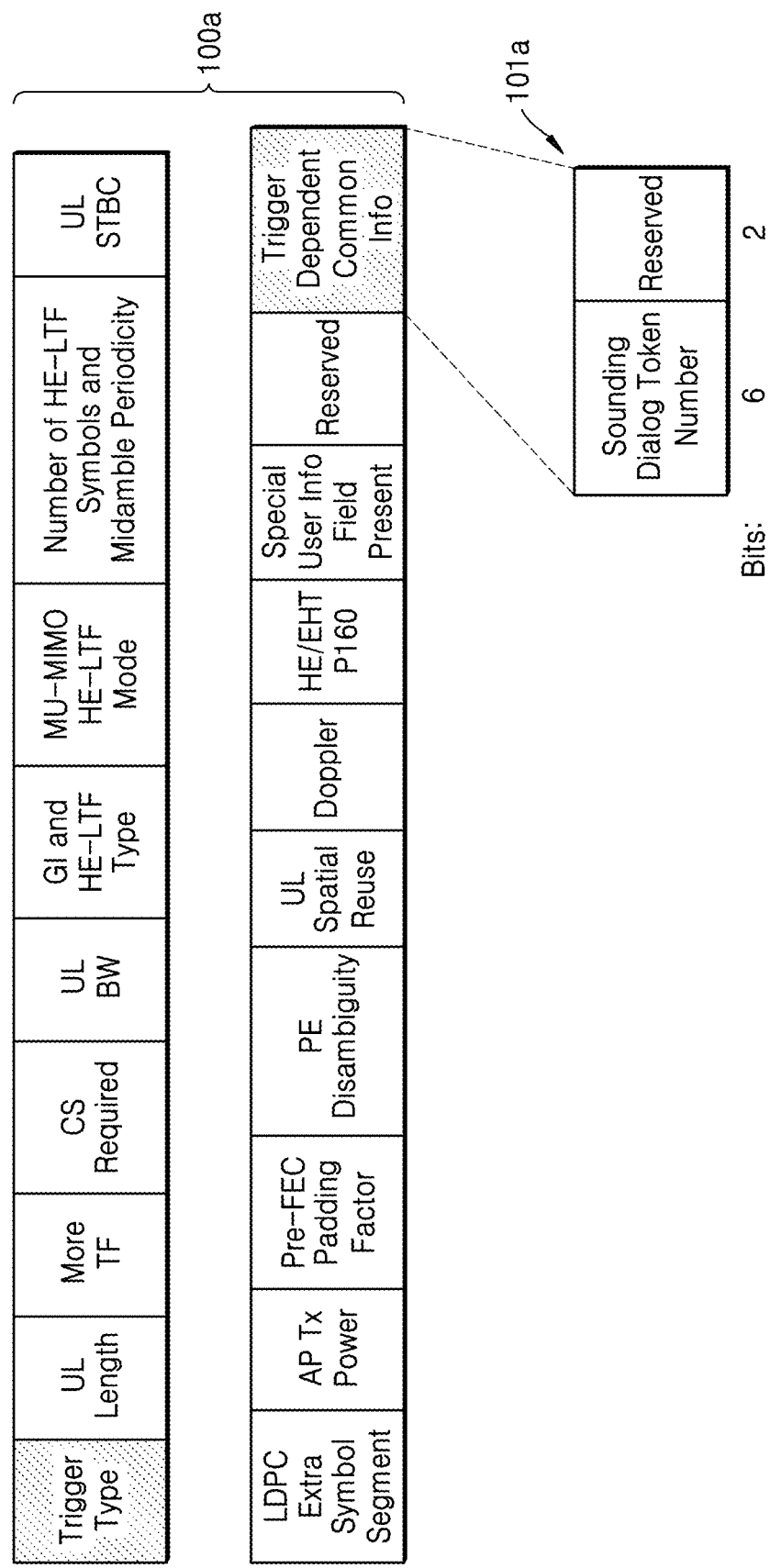
FIGS. 10A and 10B are views respectively illustrating a common information field and a user information field according to embodiments.
Figure 10B:
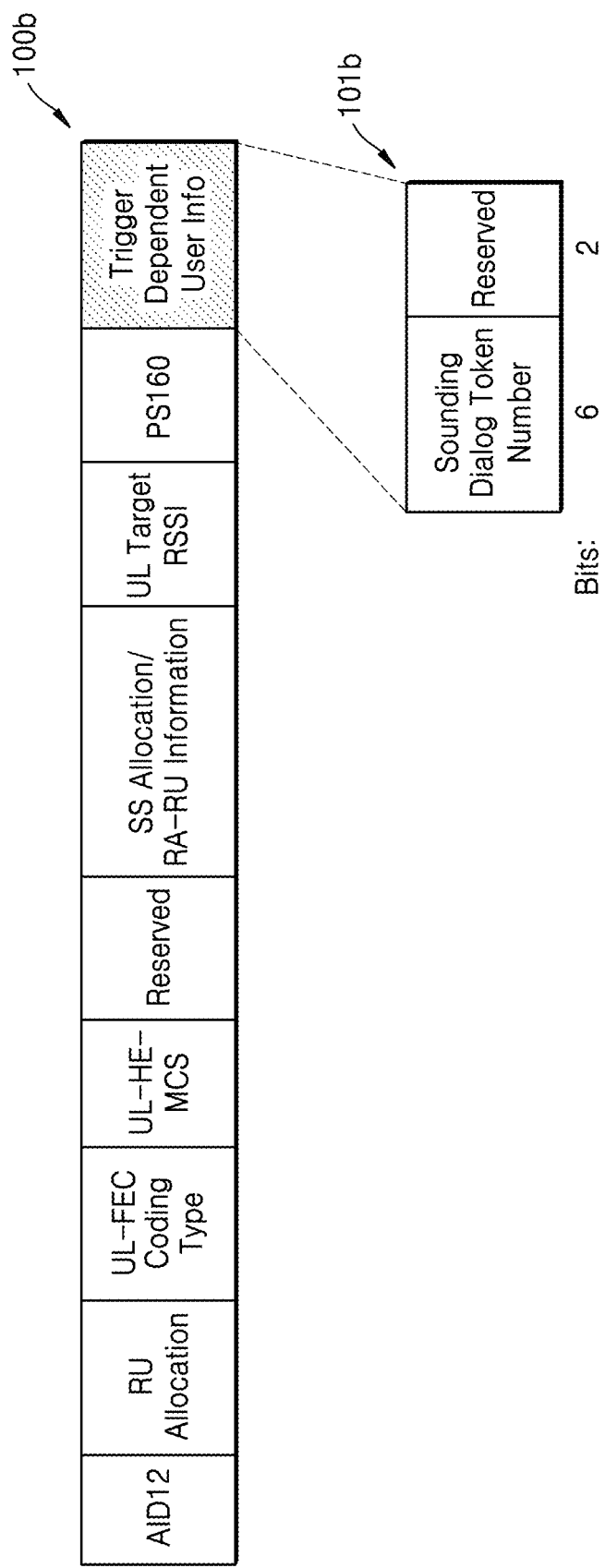

FIGS. 10A and 10B are views respectively illustrating a common information field 100a and a user information field 100b according to embodiments. In more detail, FIGS. 10A and 10B show a trigger-dependent common information subfield and a trigger-dependent user information subfield, respectively, when an encoded trigger-type subfield has a value (e.g., 8) corresponding to a first trigger frame or a value (e.g., 9) corresponding to a second trigger frame, as described above with reference to FIG. 9. Hereinafter, FIGS. 10A and 10B will be described with reference to FIG. 9.

Referring to FIG. 10A, each of a first trigger frame and a second trigger frame may include the common information field 100a including a trigger-dependent common information subfield 101a, and the trigger-dependent common information subfield 101a may include a sounding dialog token number field. Accordingly, at least one beamformer corresponding to at least one user information field included in the first trigger frame or the second trigger frame may identify a common sounding sequence number.

Compared with the example of FIG. 8A, the trigger-dependent common information subfield 101a of FIG. 10A may not include a field for distinguishing the first trigger frame from the second trigger frame. As described above with reference to FIG. 9, a station may distinguish the first trigger frame from the second trigger frame based on a trigger-type subfield included in a common information field. Accordingly, a subfield for distinguishing the first trigger frame from the second trigger frame may be omitted from the trigger-dependent common information subfield 101a.

Referring to FIG. 10B, the first trigger frame and the second trigger frame may include the user information field 100b including a trigger-dependent user information subfield 101b, and the trigger-dependent user information subfield 101b may include a sounding dialog token number field. Accordingly, a beamformer corresponding to a user information field included in the first trigger frame or the second trigger frame may identify its own sounding sequence number.

Compared with the example of FIG. 8B, the trigger-dependent user information subfield 101b of FIG. 10B may not include a field for distinguishing the first trigger frame from the second trigger frame. As described above with reference to FIG. 9, a station may distinguish the first trigger frame from the second trigger frame based on a trigger-type subfield included in a common information field. Accordingly, a subfield for distinguishing the first trigger frame from the second trigger frame may be omitted from the trigger-dependent user information subfield 101b.

Figure 11:
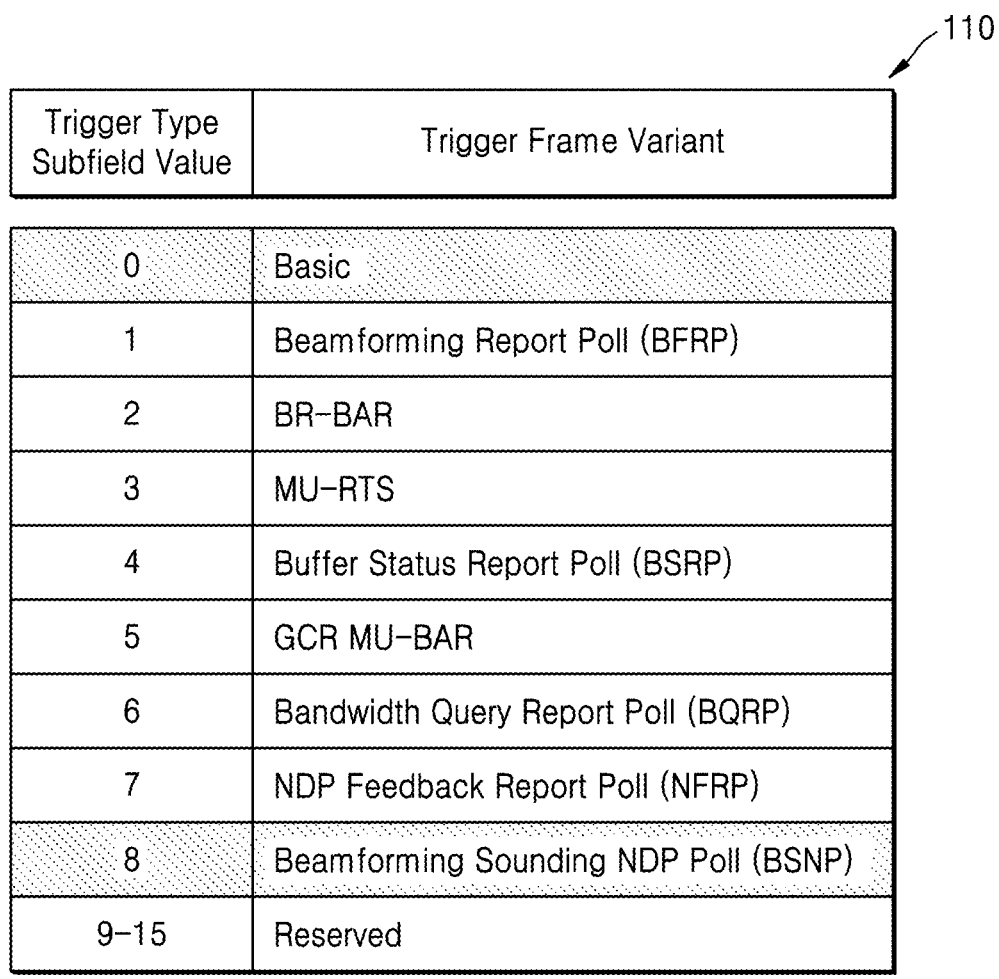
FIG. 11 is a view illustrating encoding of a trigger-type subfield according to embodiments.

FIG. 11 is a view illustrating encoding of a trigger-type subfield according to embodiments. In more detail, FIG. 11 shows table 110 defining encoding of the trigger-type subfield included in the common information field 62 of FIG. 6. As described above with reference to FIG. 6, the trigger-type subfield may have a value indicating a first trigger frame and/or a second trigger frame for uplink beamforming. Hereinafter, FIG. 11 will be described with reference to FIG. 5.

In embodiments, a first trigger frame may be defined as an independent trigger type, while a second trigger frame may correspond to a general trigger frame requesting a PPDU from a receiver (e.g., an STA). For example, as shown in FIG. 11, a trigger-type subfield may have one of values from 0 to 8 corresponding to Basic, BFRP, BR-BAR, MU-RTS, BSRP, GCR MU-BAR, BQRP, NFRP, and BSNP, respectively. The first trigger frame may have a value of 8 corresponding to BSNP, while the second trigger frame may have a value of 0 corresponding to Basic. Accordingly, the first station STA1 may identify the first trigger frame when a trigger-type subfield extracted from a trigger frame has a value of 8. In addition, the first station STA1 may identify the second trigger frame when a trigger-type subfield extracted from a trigger frame has a value of 0, and as described later with reference to FIG. 12, may identify whether to transmit a beamformed PPDU according to a value included in a user information field corresponding to the first station STA1.

In embodiments, the first trigger frame may include a common information field from which a trigger-dependent common information subfield is omitted, and may include the user information field 100b including the trigger-dependent user information subfield 101b of FIG. 10B. In embodiments, the second trigger frame may include a user information field requesting a beamformed PPDU.

Figure 12:
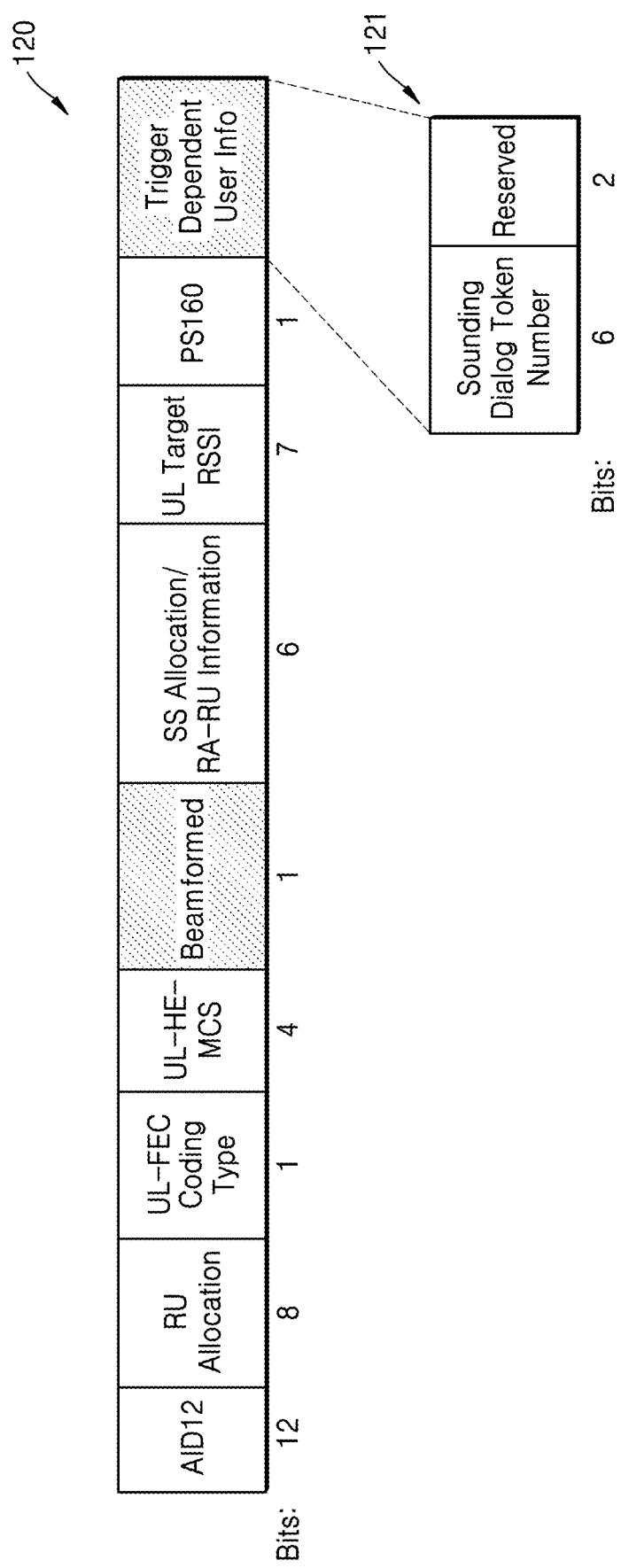
FIG. 12 is a view of a user information field 120 according to embodiments.

FIG. 12 is a view of a user information field 120 according to embodiments. In more detail, FIG. 12 shows the user information field 120 when an encoded trigger-type subfield has a value (e.g., 0) corresponding to a second trigger frame, as described above with reference to FIG. 11. Hereinafter, FIG. 12 will be described with reference to FIG. 11.

Referring to FIG. 12, the user information field 120 may include a plurality of subfields, for example, a plurality of subfields defined by EHT. In embodiments, the user information field 120 may include a subfield having a value indicating a beamformed PPDU or a non-beamformed PPDU. For example, as shown in FIG. 12, the user information field 120 may include a Beamformed subfield. In embodiments, the user information field 120 for requesting a beamformed PPDU from a station corresponding to a value of an AID12 subfield may include a Beamformed subfield having a value of 1, while the user information field 120 for requesting a non-beamformed PPDU from the station corresponding to the value of the AID12 subfield may include a Beamformed subfield having a value of 0. The station may identify the user information field 120 corresponding to the station based on the AID subfield, and may identify that an access point requests a beamformed PPDU or a non-beamformed PPDU based on a Beamformed subfield extracted from the user information field 120. In addition, the user information field 120 may include a trigger-dependent user information subfield 121 including a sounding dialog token number field, similar to the user information field 100b of FIG. 10B.

Figure 13A:
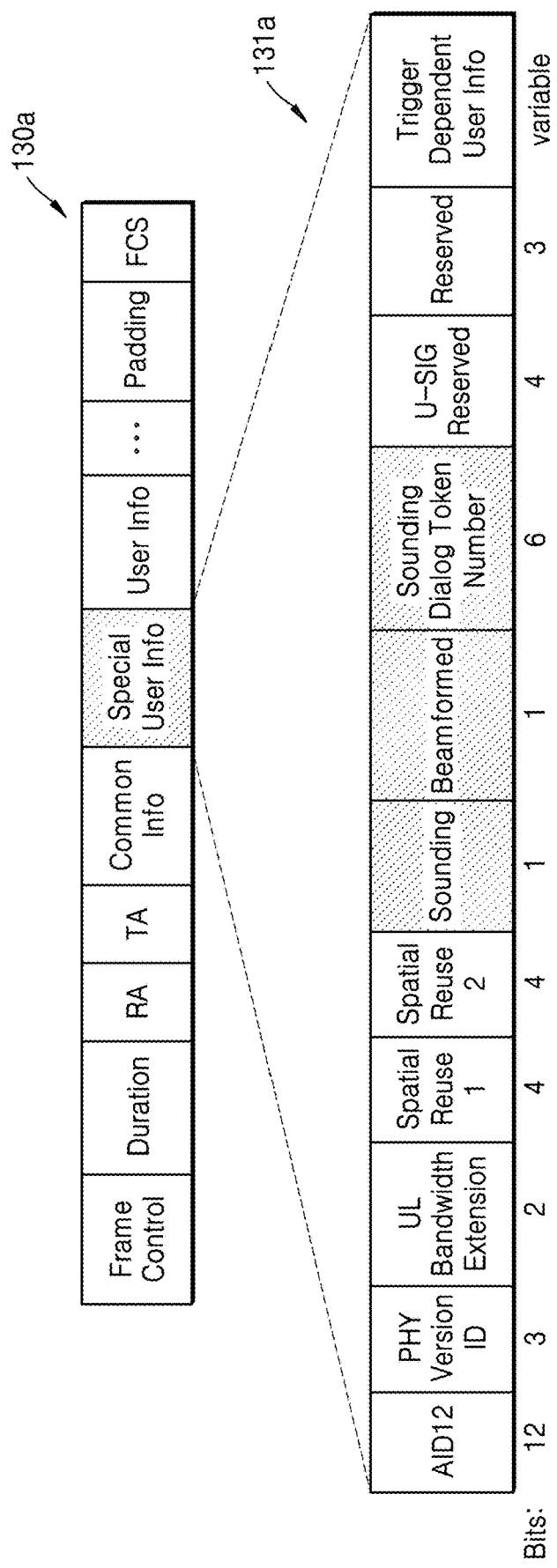
FIGS. 13A and 13B are views of trigger frames according to embodiments.
Figure 13B:
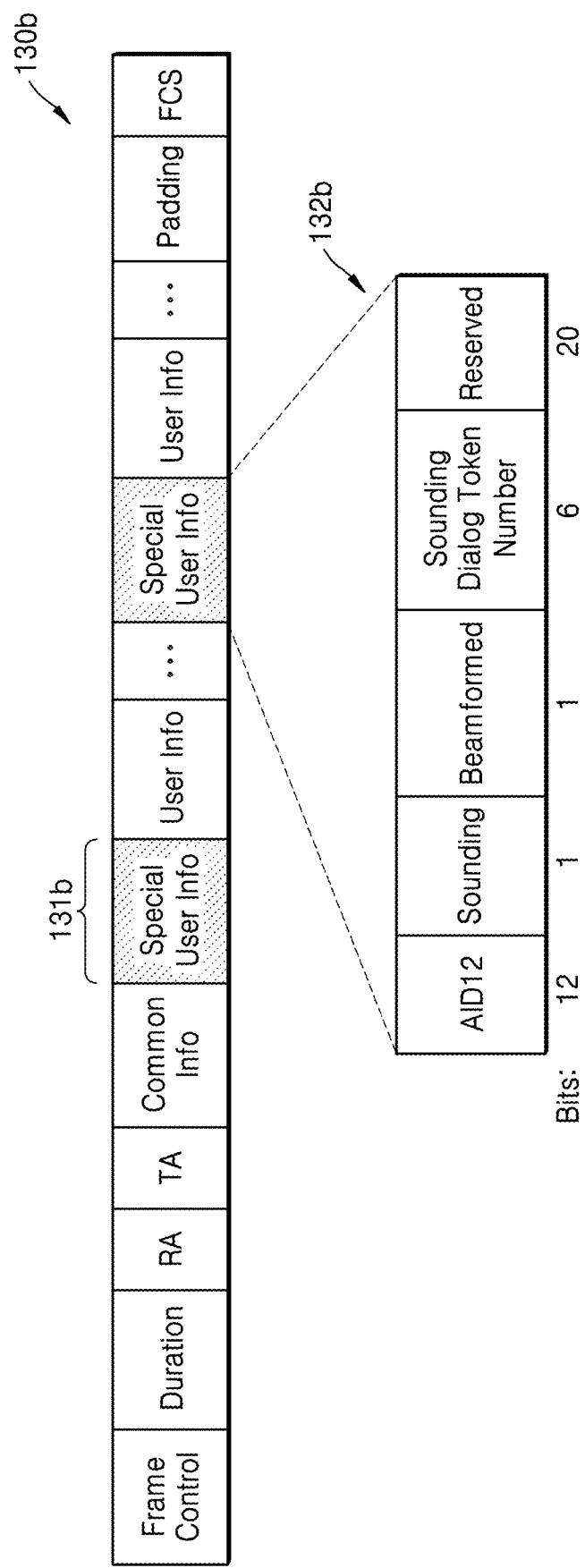

FIGS. 13A and 13B are views of trigger frames 130a and 130b according to embodiments. In more detail, FIGS. 13A and 13B show trigger frames 130a and 130b and special user information fields 131a and 131b included in the trigger frames 130a and 130b, respectively. As described later below, the special user information fields 131a and 131b may include an identifier subfield (e.g., AID12) having a predefined or alternatively, given value. Hereinafter, FIGS. 13A and 13B will be described with reference to FIG. 5.

Referring to FIG. 13A, the trigger frame 130a may include the special user information field 131a. For example, the special user information field 131a following a common information field may be defined in the trigger frame 130a. The special user information field 131a may include a plurality of subfields, and an AID12 subfield from among the plurality of subfields may have a predefined or alternatively, given value. For example, the AID12 subfield of the special user information field 131a defined by EHT may have a value 2007, and the value 2007 may be an identifier not assigned to any stations. When the value of the AID12 subfield is 2007, an EHT station may identify the corresponding user information field 131a as the special user information field 131a. The special user information field 131a may have a different configuration from other user information fields (e.g., 63 in FIG. 6). For example, as shown in FIG. 13A, at least one of the subfields included in the special user information field 131a may be different from subfields included in other user information fields. According to embodiments, the special user information field 131a includes a physical layer version identifier subfield, a bandwidth extension subfield, and/or at least one spatial reuse subfield.

In embodiments, the special user information field 131a may include a subfield having a sounding sequence number. For example, as shown in FIG. 13A, the special user information field 131a may include a sounding dialog token number subfield. In addition, in embodiments, the special user information field 131a may include at least one subfield for distinguishing a first trigger frame from a second trigger frame. For example, as shown in FIG. 13A, the special user information field 131a may include a Sounding subfield and a Beamformed subfield, and a first trigger frame and a second trigger frame may include different values in the Sounding subfield and the Beamformed subfield, respectively. A station may identify the special user information field 131a based on an AID12 subfield having a predefined or alternatively, given value, may identify a first trigger frame or a second trigger frame in the special user information field 131a, and may identify a sounding sequence number. In embodiments, the Sounding subfield, the Beamformed subfield, and the sounding dialog token number subfield may be arranged differently from that shown in FIG. 13A in the special user information field 131a.

Referring to FIG. 13B, the trigger frame 130b may include at least one special user information field 131b. For example, as described above with reference to FIG. 13A, the trigger frame 130b may include a first special user information field 131b following a common information field and a second special user information field 132b including information for uplink beamforming. Similar to the first special user information field 131b, the second special user information field 132b may include a plurality of subfields, and an AID12 subfield from among the plurality of subfields may have a predefined or alternatively, given value.

In embodiments, the second special user information field 132b may have one of several values reserved in a legacy protocol standard in the AID12 subfield. For example, among values of AID12 in HE, 2008 to 2044 and 2047 to 4094 may be reserved values, and the second special user information field 132b may have one of the reserved values. Accordingly, stations based on the legacy protocol standard may ignore the second special user information field 132b, while stations capable of supporting uplink beamforming may identify the second special user information field 132b. In embodiments, the first special user information field 131b may be omitted from the trigger frame 130b.

In embodiments, the second special user information field 132b may include a Sounding subfield, a Beamformed subfield, and a sounding dialog token number subfield, similar to the special user information field 131a of FIG. 13A. The first trigger frame and the second trigger frame may include different values in the Sounding subfield and the Beamformed subfield, respectively. In embodiments, the Sounding subfield, the Beamformed subfield, and the sounding dialog token number subfield may be arranged differently from that shown in FIG. 13B in the second special user information field 132b.

Figure 14:
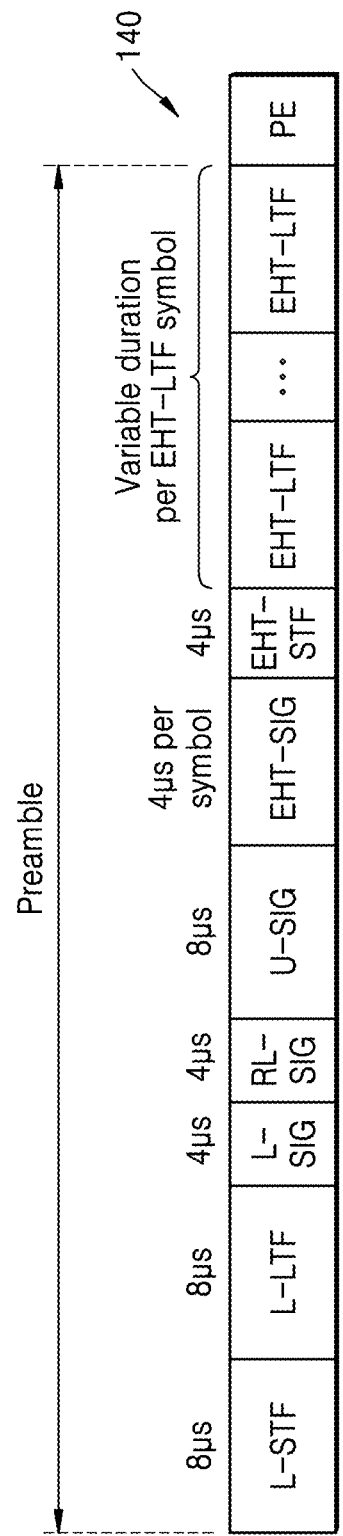
FIG. 14 is a view of a sounding null data packet (NDP) according to embodiments.

FIG. 14 is a view of a sounding NDP according to embodiments. In more detail, FIG. 14 shows a TB PPDU 140 of EHT as an example of a sounding NDP. As described above with reference to FIGS. 4A and 4B and FIG. 5, a beamformer, for example, a station, may transmit a sounding NDP to a beamformee, that is, an access point, in response to a first trigger frame.

Referring to FIG. 14, in uplink beamforming, the sounding NDP may be the TB PPDU 140. In embodiments, a data field may be omitted from the sounding NDP. For example, as shown in FIG. 14, the TB PPDU 140 may include a preamble including a plurality of training fields and a plurality of signaling fields. The TB PPDU 140 may include a legacy-short training field (L-STF), a legacy-long training field (L-LTF), a legacy-signal (L-SIG) field, a repeated L-SIG (RL-SIG) field, a universal-signal (U-SIG) field, an extremely high throughput-signal (EHT-SIG) field, an extremely high throughput-STF (EHT-STF), and/or an extremely high throughput-LTF (EHT-LTF) in the preamble, and may further include a packet extension (PE) field. In embodiments, the EHT-SIG field may be omitted. As described above with reference to FIG. 5, the beamformee (e.g., an access point) may estimate a channel state based on the preamble of the TB PPDU 140 and may generate feedback information to be provided to the beamformer.

FIG. 15 is a view of a feedback frame according to embodiments. In more detail, table 150 of FIG. 15 shows fields included in a feedback frame provided by a beamformee (e.g., an access point) to a beamformer (e.g., a station) in a sounding protocol for uplink beamforming. Table 150 shows a feedback frame defined by EHT, but it should be noted that the feedback frame may be similarly defined by EHT+.

Referring to FIG. 15, the feedback frame may include a category field and an EHT action field (or simply an action field). The category field may have a value indicating a category of the feedback frame, and the EHT action field may have a value indicating an action of the feedback frame, which is an action frame. An example of the category field will be described later below with reference to FIG. 16, and an example of the EHT action field will be described later below with reference to FIG. 17.

The feedback frame may be provided to at least one beamformer, and accordingly, may include feedback information corresponding to each of the at least one beamformer. For example, as shown in FIG. 15, the feedback frame may include an uplink beamforming MIMO control field (or an MIMO control field) and an uplink beamforming compressed beamforming report field (or a beamforming report field) for the first station STA1, may include an uplink beamforming MIMO control field and an uplink beamforming compressed beamforming report field for the second station STA2, and may include an uplink beamforming MIMO control field and an uplink beamforming compressed beamforming report field for an $n^{th}$ station STAn (n is an integer greater than zero). Different from the feedback frame for downlink beamforming of FIG. 3, as described later with reference to FIGS. 18A and 18B, a control field and/or a report field included in a feedback frame for uplink beamforming may include an identifier (e.g., AID12) corresponding to the beamformer (e.g., the station). According to embodiments, the MIMO control field is adjacent to the beamforming control field in the feedback frame.

Figure 16:
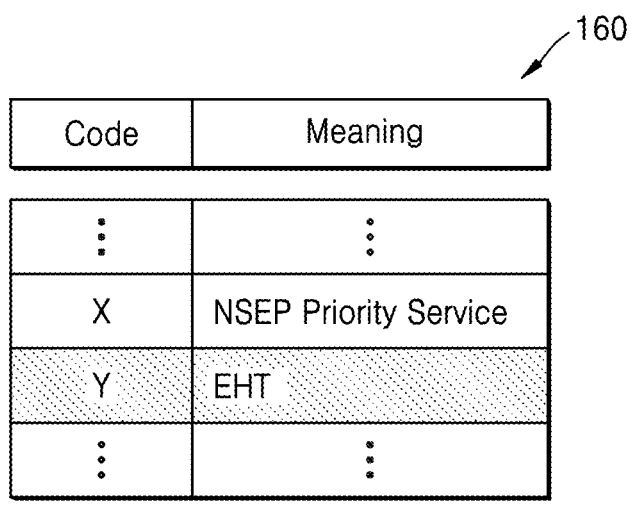
FIG. 16 is a view illustrating encoding of a category field according to embodiments.
Figure 17:
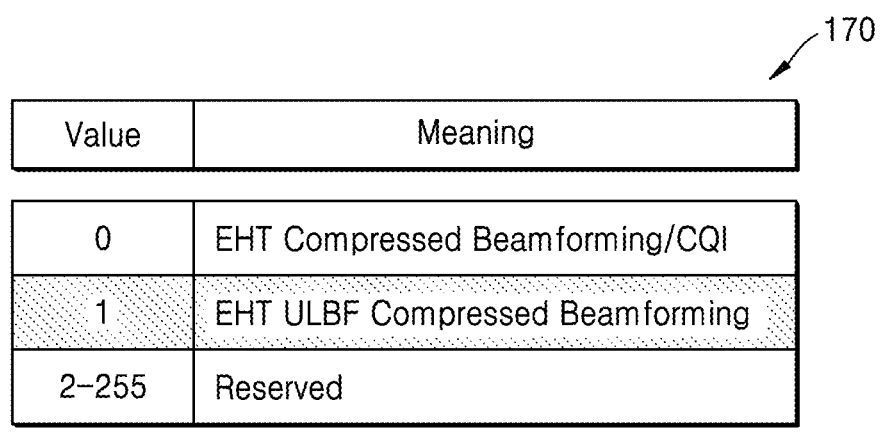
FIG. 17 is a view illustrating encoding of an action field according to embodiments.

FIG. 16 is a view illustrating encoding of a category field according to embodiments, and FIG. 17 is a view illustrating encoding of an action field according to embodiments. As described above with reference to FIG. 15, a feedback frame for uplink beamforming may include a category field and an action field as an action frame. Hereinafter, FIGS. 16 and 17 will be described with reference to FIG. 15.

Referring to FIG. 16, table 160 may define the encoding of the category field. As shown in FIG. 16, the category field may have a value corresponding to a national security and emergency preparedness (NSEP) priority service (e.g., X) or a value corresponding to EHT (e.g., Y). In embodiments, the category field may have a value corresponding to HE (e.g., 30) or a value corresponding to a protected HE (e.g., 31). The feedback frame may include a category field having a value indicating a protocol standard supporting uplink beamforming. For example, because uplink beamforming may not be supported in the HE, a category field encoded as in table 160 may have a value Y in the feedback frame.

Referring to FIG. 17, table 170 may define the encoding of the action field. As described above with reference to FIG. 16, when the category field has a value (e.g., Y) indicating an EHT, the action field may have a value (e.g., 0) corresponding to an EHT compressed beamforming/CQI frame or a value (e.g., 1) corresponding to an uplink compressed beamforming frame as shown in FIG. 17. The feedback frame may include an action field having a value indicating a feedback frame used for uplink beamforming. For example, an action field encoded as in table 170 may have a value of 1 in the feedback frame.

Figure 18A:
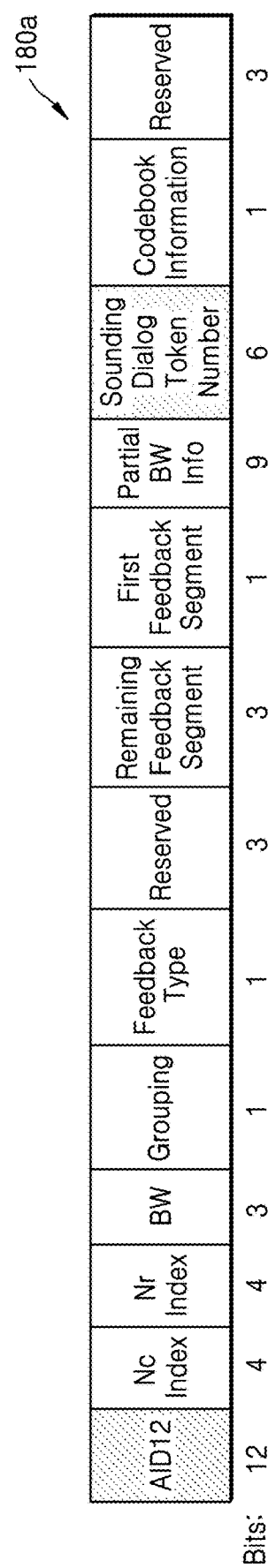
FIGS. 18A and 18B are views illustrating examples of an uplink beamforming multiple-input multiple-output (MIMO) control field according to embodiments.
Figure 18B:
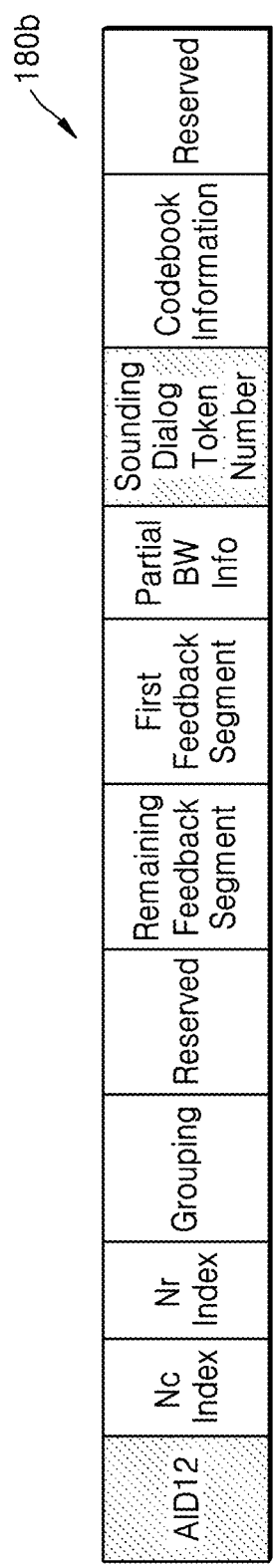

FIGS. 18A and 18B are views illustrating examples of an uplink beamforming MIMO control field according to embodiments. As described above with reference to FIG. 15, a feedback frame for uplink beamforming may include at least one uplink beamforming MIMO control field corresponding to at least one beamformer (e.g., a station). Hereinafter, redundant descriptions of FIGS. 18A and 18B will not be given herein.

Referring to FIG. 18A, an uplink beamforming MIMO control field 180*a* may include an AID12 subfield, an Nc Index subfield, an Nr Index subfield, a BW subfield, a Grouping subfield, a Feedback Type subfield, a Reserved subfield, a Remaining Feedback Segments subfield, a First Feedback Segment subfield, a Partial BW Info subfield, a Sounding Dialog Token Number subfield, and/or a Codebook Information subfield. In embodiments, as shown in FIG. 18A, the Feedback Type subfield may have a length of 1-bit, and may have a value corresponding to a single user (SU) or a multi-user (MU). The remaining subfields included in the uplink beamforming MIMO control field 180*a*, that is, the Nc Index subfield, the Nr Index subfield, the BW subfield, the Grouping subfield, the Remaining Feedback Segments subfield, the First Feedback Segment subfield, the Partial BW Info subfield, the Sounding Dialog Token Number subfield, and the Codebook Information subfield, may be defined similarly to corresponding subfields in an MIMO control field used for downlink beamforming, respectively.

As described above with reference to FIG. 15, a feedback frame may include at least one uplink beamforming MIMO control field corresponding to at least one beamformer, respectively, and a beamformer may identify the uplink beamforming MIMO control field 180*a* corresponding to the beamformer based on the AID12 subfield included in the uplink beamforming MIMO control field 180*a*.

Referring to FIG. 18B, an uplink beamforming MIMO control field 180*b* may include an AID12 subfield, an Nc Index subfield, an Nr Index subfield, a Grouping subfield, a Reserved subfield, a Remaining Feedback Segments subfield, a First Feedback Segment subfield, a Partial BW Info subfield, a Sounding Dialog Token Number subfield, and/or a Codebook Information subfield. Compared with the uplink beamforming MIMO control field 180*a* of FIG. 18A, a BW subfield defining a bandwidth and/or a Feedback Type subfield defining an SU, an MU, or a channel quality indicator (CQI) may be omitted from the uplink beamforming MIMO control field 180*b* of FIG. 18B.

Figure 19:
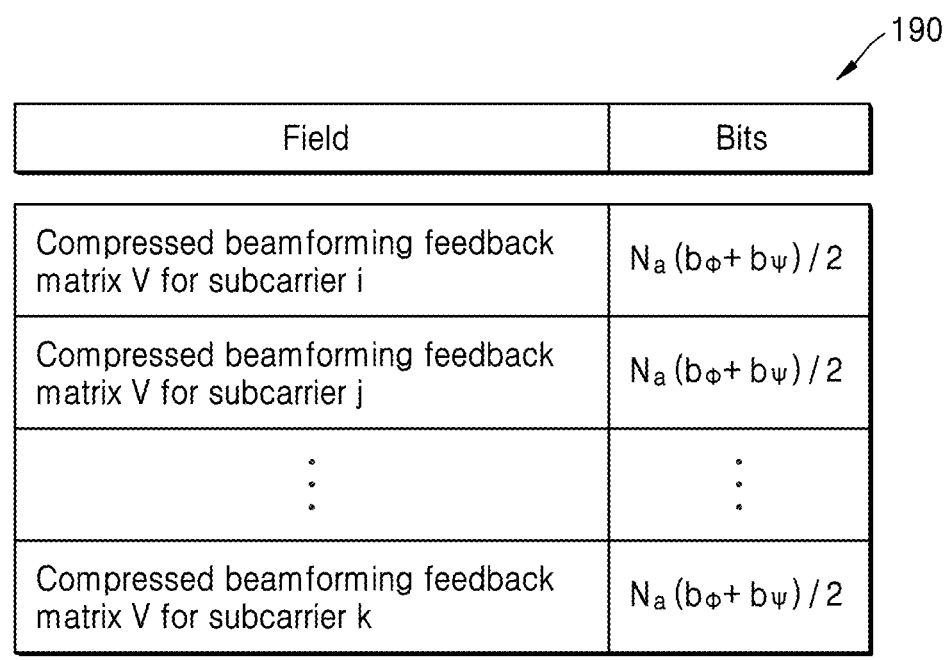
FIG. 19 is a view illustrating encoding of an uplink beamforming compressed beamforming report field according to embodiments.

FIG. 19 is a view illustrating encoding of an uplink beamforming compressed beamforming report field according to embodiments. FIG. 19 shows table 190 defining encoding of an uplink beamforming compressed beamforming report field included in the feedback frames of FIGS. 4A and 4B and FIG. 5.

Referring to FIG. 19, a beamformee (e.g., an access point) may generate an uplink beamforming compressed beamforming report field including channel information measured for each subcarrier. For example, as shown in FIG. 19, the beamformee may generate a feedback matrix V for each subcarrier (e.g., subcarriers i, j, . . . k, where each of i, j and k represent integers), and the feedback matrix V may be defined by a downlink angle $\varphi$ and an angle $\psi$. When $N_a$ is the number of angles $\varphi$ and angles $\psi$, $b_\varphi$ is the number of bits to represent $\varphi$, and $b_\psi$ is the number of bits to represent $\psi$, as shown in FIG. 19, the number of bits of a field for defining the feedback matrix V may be $N_a(b_\varphi+b_\psi)/2$.

A beamformee providing feedback information in uplink beamforming may be an access point, and the access point may determine a modulation and coding scheme (MCS) of uplink transmission based on an uplink channel. Accordingly, unlike in a sounding protocol for downlink beamforming, where a feedback frame includes information about an SNR measured based on a sounding NDP, in a sounding protocol for uplink beamforming, the feedback frame may not include information about an SNR (e.g., an average SNR). For example, as shown in FIG. 19, an average SNR per stream may be omitted from the uplink beamforming compressed beamforming report field.

Figure 20A:
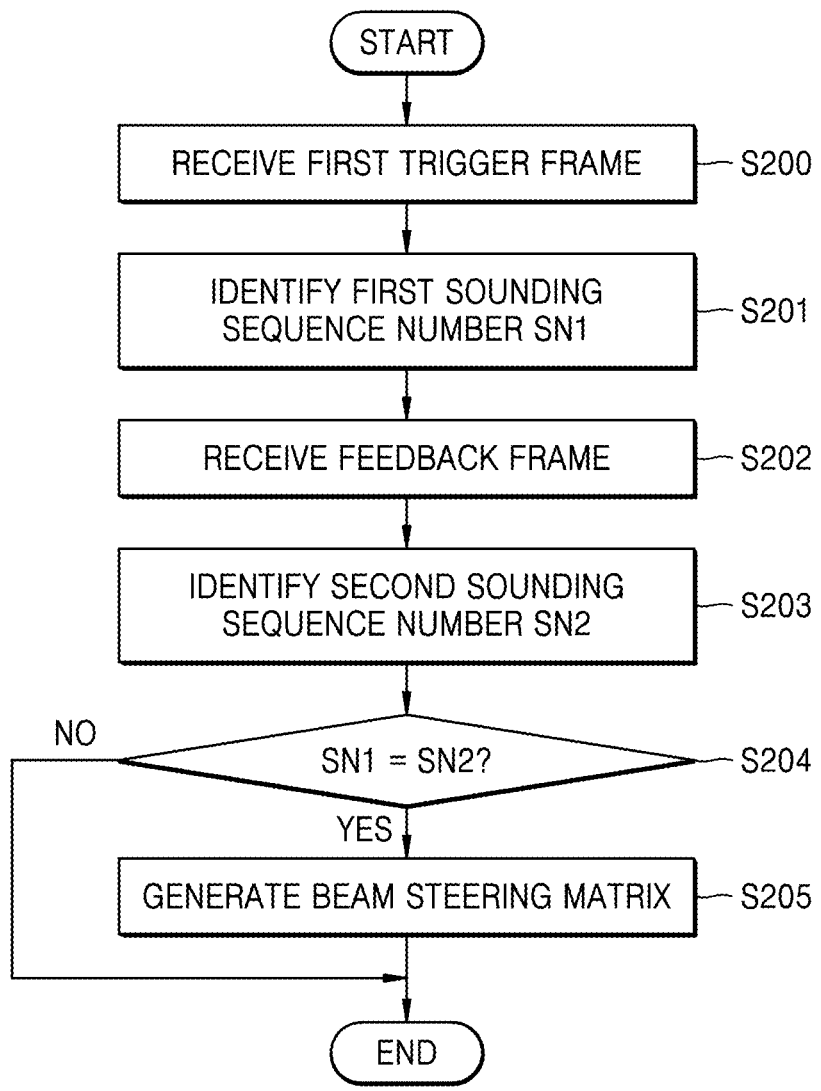
FIGS. 20A and 20B are flowcharts illustrating a method for uplink beamforming according to embodiments.
Figure 20B:
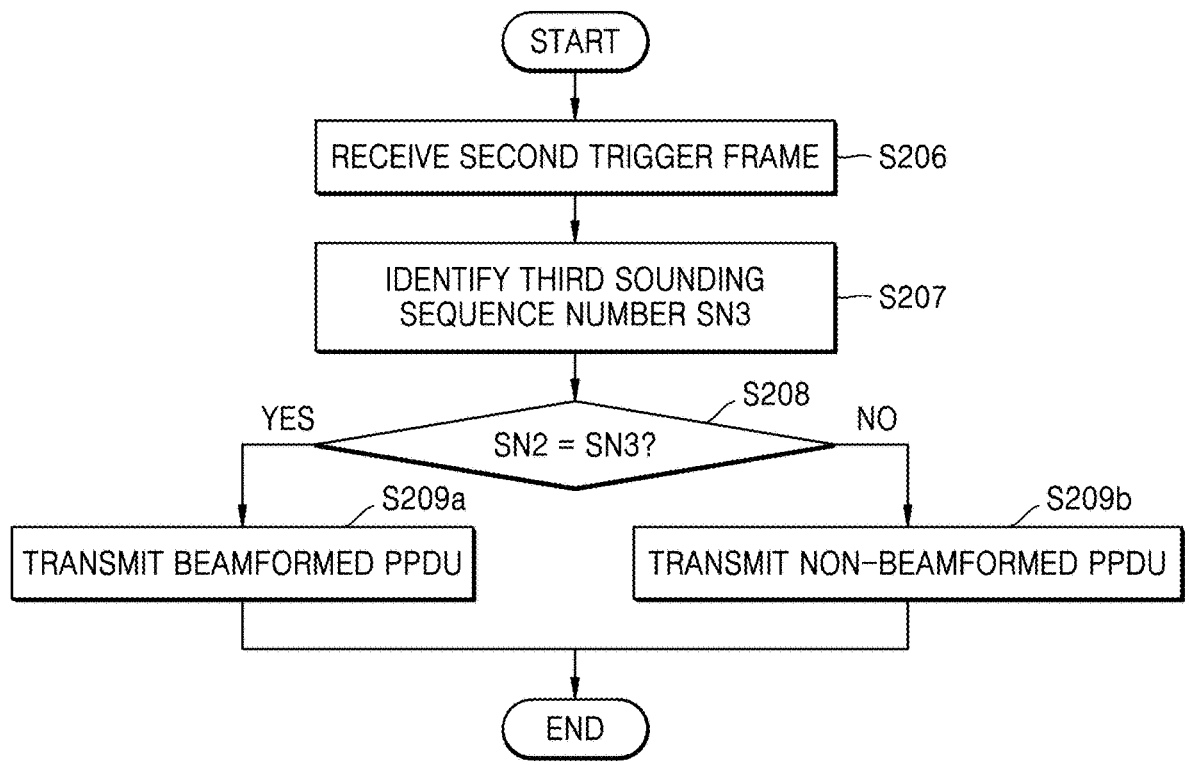

FIGS. 20A and 20B are flowcharts illustrating a method for uplink beamforming according to embodiments. In more detail, the flowcharts of FIGS. 20A and 20B show examples of operations of a station that is a beamformer in uplink beamforming. In embodiments, the methods of FIGS. 20A and 20B may be performed by the first station STA1 of FIG. 5. Hereinafter, FIGS. 20A and 20B will be described with reference to FIG. 5.

Referring to FIG. 20A, in operation S200, a first trigger frame may be received. For example, the access point AP may provide a first trigger frame to the first station STA1 to request a sounding NDP from the first station STA1 for uplink beamforming. In embodiments, as described above with reference to FIGS. 7, 8A and 8B, the first station STA1 may identify the first trigger frame based on a trigger-type subfield and a trigger-dependent subfield. In embodiments, as described above with reference to FIG. 9, the first station STA1 may identify the first trigger frame based on a trigger-type subfield. In embodiments, as described above with reference to FIGS. 13A and 13B, the first station STA1 may identify the first trigger frame based on a trigger-type subfield and a special user information field.

In operation S201, a first sounding sequence number SN1 may be identified. For example, the first station STA1 may identify the first sounding sequence number SN1 from the first trigger frame received in operation S200. In embodiments, as described above with reference to FIGS. 8A, 8B, 10A and 10B, the first sounding sequence number SN1 may be included in a trigger-dependent subfield (e.g., a trigger-dependent common information subfield and/or a trigger-dependent user information subfield) included in the first trigger frame. In embodiments, as described above with reference to FIGS. 13A and 13B, the first sounding sequence number SN1 may be included in a special user information field included in the first trigger frame.

In operation S202, a feedback frame may be received. For example, the first station STA1 may provide a sounding NDP to the access point AP in response to the first trigger frame received in operation S200, and the access point AP may provide a feedback frame including feedback information generated based on the sounding NDP to the first station STA1. As described above with reference to FIG. 15 and the like, the first station STA1 may extract feedback information corresponding to the first station STA1 from the feedback frame.

In operation S203, a second sounding sequence number SN2 may be identified. For example, the first station STA1 may identify the second sounding sequence number SN2 from the feedback frame received in operation S202. In embodiments, as described above with reference to FIGS. 18A and 18B the second sounding sequence number SN2 may be included in an uplink beamforming MIMO control field.

In operation S204, the first sounding sequence number SN1 may be compared with the second sounding sequence number SN2. For example, the first station STA1 may compare the first sounding sequence number SN1 identified from the first trigger frame with the second sounding sequence number SN2 identified from the feedback frame. As shown in FIG. 20A, when the first sounding sequence number SN1 is the same as (or similar to) (e.g., matches) the second sounding sequence number SN2, in operation S205, a beam steering matrix may be generated. On the other hand, when the first sounding sequence number SN1 is not the same as (or similar to) (e.g., matches) the second sounding sequence number SN2, the execution of operation S205 may be omitted, and a beam steering matrix may not be generated.

Referring to FIG. 20B, in operation S206, the second trigger frame may be received. For example, after providing feedback information to the first station STA1 through a feedback frame, the access point AP may provide the second trigger frame to the first station STA1 to request a beamformed PPDU. In embodiments, as described above with reference to FIGS. 7, 8A and 8B, the first station STA1 may identify the second trigger frame based on a trigger-type subfield and a trigger-dependent subfield. In embodiments, as described above with reference to FIG. 9, the first station STA1 may identify the second trigger frame based on a trigger-type subfield. In embodiments, as described above with reference to FIGS. 13A and 13B, the first station STA1 may identify the second trigger frame based on a trigger-type subfield and a special user information field.

In operation S207, a third sounding sequence number SN3 may be identified. For example, the first station STA1 may identify the third sounding sequence number SN3 from the second trigger frame received in operation S206. In embodiments, as described above with reference to FIGS. 8A, 8B, 10A and 10B, the third sounding sequence number SN3 may be included in a trigger-dependent subfield (e.g., a trigger-dependent common information subfield and/or a trigger-dependent user information subfield) included in the second trigger frame. In embodiments, as described above with reference to FIGS. 13A and 13B, the third sounding sequence number SN3 may be included in a special user information field included in the second trigger frame.

In operation S208, the second sounding sequence number SN2 (and/or the first sounding sequence number SN1) may be compared with the third sounding sequence number SN3. For example, the first station STA1 may compare the second sounding sequence number SN2 identified from a feedback frame with the third sounding sequence number SN3 identified from the second trigger frame. As shown in FIG. 20B, when the second sounding sequence number SN2 (and/or the first sounding sequence number SN1) is the same as (or similar to) (e.g., matches) the third sounding sequence number SN3, operation S209a may be performed subsequently. On the other hand, when the second sounding sequence number SN2 (and/or the first sounding sequence number SN1) is not the same as (or similar to) (e.g., does not match) the third sounding sequence number SN3, operation S209b may be performed subsequently.

In operation S209a, a beamformed PPDU may be transmitted. For example, when the second sounding sequence number SN2 (and/or the first sounding sequence number SN1) is the same as (or similar to) the third sounding sequence number SN3, the first station STA1 may identify that the second trigger frame requests uplink beamforming based on a feedback frame including the second sounding sequence number SN2. Accordingly, the first station STA1 may transmit a beamformed PPDU to the access point AP based on a beam steering matrix generated based on the feedback frame.

In operation S209b, a non-beamformed PPDU may be transmitted. For example, when the second sounding sequence number SN2 (and/or the first sounding sequence number SN1) is not the same as (or similar to) the third sounding sequence number SN3, the first station STA1 may identify that the second trigger frame is independent of uplink beamforming based on the feedback frame including the second sounding sequence number SN2. Accordingly, the first station STA1 may transmit the non-beamformed PPDU to the access point AP.

Figure 21:
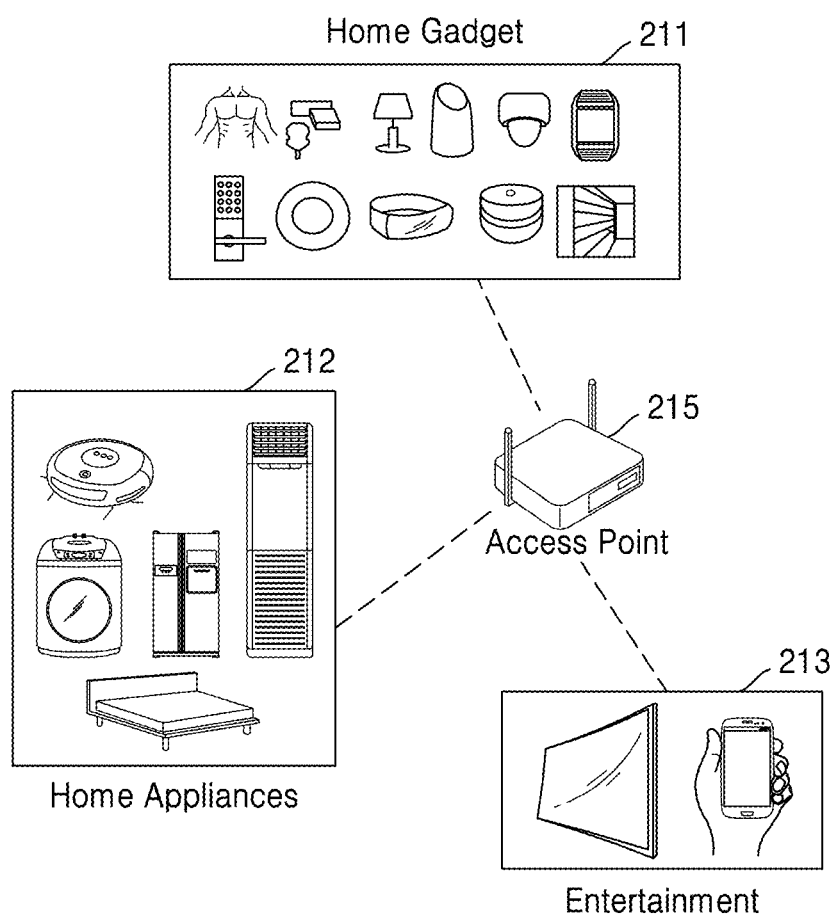
FIG. 21 is a view illustrating examples of an apparatus for wireless communication according to embodiments.

FIG. 21 is a view illustrating examples of an apparatus for wireless communication according to embodiments. In more detail, FIG. 21 illustrates an Internet of Things (IoT) network system including a home gadget 211, a home appliance 212, an entertainment device 213, and/or an access point 215.

In embodiments, in the apparatus for wireless communication of FIG. 21, the uplink beamforming described above with reference to the drawings may be performed. The access point 215 may sequentially provide a first trigger frame requesting a sounding NDP, a feedback frame including feedback information, and a second trigger frame requesting a beamformed PPDU to the home gadget 211, the home appliance 212, and/or the entertainment device 213. In addition, the home gadget 211, the home appliance 212, and/or the entertainment device 213 may provide a sounding NDP to the access point 215 in response to the first trigger frame, may generate a beam steering matrix based on the feedback frame, and may provide a beamformed PPDU to the access point 215 in response to the second trigger frame. Accordingly, not only downlink beamforming but also uplink beamforming may be implemented in a WLAN system, and the efficiency and throughput of uplink transmission may be increased.

Wireless communication devices utilize beamforming to improve communication performance (e.g., increased signal to noise ratio, reduced disconnections, etc.), throughput, efficiency, etc. Conventional wireless communication devices perform beamforming on downlink transmissions but are unable to perform beamforming on uplink transmissions. Accordingly, the conventional wireless communication devices fail to sufficiently exploit beamforming on uplink transmissions, resulting in insufficient communication performance, throughput, efficiency, etc., in the uplink transmissions.

However, according to embodiments, improved wireless communication devices are provided that are able to perform beamforming on uplink transmissions. For example, the improved wireless communication devices may perform a protocol including transmission of trigger frames and a feedback frame via a downlink connection. Such a protocol may provide sufficient signaling and data to enable transmission of a beamformed PPDU via an uplink. Accordingly, the improved wireless communication devices overcome the deficiencies of the conventional wireless communication devices to permit beamforming on uplink transmissions, and thereby, improve communication performance (e.g., increased signal to noise ratio, reduced disconnections, etc.), throughput, efficiency, etc., of the uplink transmissions.

Additionally, according to embodiments, the improved wireless communication devices are able to perform beamforming on both uplink and downlink transmissions. For example, the improved wireless communication devices may perform beamforming on downlink transmissions according to a known protocol, and perform beamforming on uplink transmissions using a protocol according to embodiments. Therefore, the improved wireless communication devices are able to improve an overall communication performance (e.g., increased signal to noise ratio, reduced disconnections, etc.), throughput, efficiency, etc., of the downlink and uplink transmissions.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously or in some cases be performed in reverse order. As used herein the term "and/or" includes any and all combinations of one or more of the associated listed items.

While the inventive concepts have been particularly shown and described with reference to embodiments thereof, it will be understood that various changes in form and details may be made therein without departing from the spirit and scope of the following claims.

What is claimed is:

1. A wireless communication method by a first device, the method comprising:
   providing a first trigger frame to at least one second device, the first trigger frame requesting at least one sounding null data packet (NDP);
   providing a feedback frame to the at least one second device, the feedback frame including feedback information generated based on the at least one sounding NDP; and
   providing a second trigger frame to the at least one second device, the second trigger frame requesting at least one beamformed physical layer protocol data unit (PPDU),
   wherein each of the first trigger frame and the feedback frame comprises a sounding dialog token number field having a sounding sequence number.

2. The method of claim 1, wherein the first trigger frame comprises a trigger-dependent subfield including the sounding dialog token number field.

3. The method of claim 2, wherein
   the second trigger frame comprises a trigger-dependent subfield including the sounding dialog token number field; and
   each of the first trigger frame and the second trigger frame comprise a trigger-type subfield having a first value.

4. The method of claim 3, wherein
   the trigger-dependent subfield of the first trigger frame comprises a second value indicating a sounding trigger; and
   the trigger-dependent subfield of the second trigger frame comprises a third value indicating a beamforming trigger.

5. The method of claim 2, wherein
   the first trigger frame comprises a trigger-type subfield having a first value indicating a sounding trigger; and
   the second trigger frame comprises a trigger-type subfield having a second value indicating a PPDU trigger.

6. The method of claim 5, wherein the second trigger frame comprises a trigger-dependent subfield including the sounding dialog token number field.

7. The method of claim 5, wherein the second trigger frame comprises a user information field including a subfield having a value indicating whether the PPDU trigger is a beamformed PPDU trigger.

8. The method of claim 1, wherein
   each of the first trigger frame and the second trigger frame comprises a special user information field including an identifier subfield having a defined value; and
   the special user information field comprises the sounding dialog token number field.

9. The method of claim 8, wherein the defined value is a value reserved in a legacy protocol.

10. The method of claim 8, wherein
    the first trigger frame comprises a first value indicating a sounding trigger in the special user information field; and
    the second trigger frame comprises a second value indicating a beamforming trigger in the special user information field.

11. The method of claim 8, wherein
    each of the first trigger frame and the second trigger frame comprises a common information field;
    the special user information field comprises a physical layer version identifier subfield, a bandwidth extension subfield, and at least one spatial reuse subfield; and the special user information field follows the common information field in each of the first trigger frame and the second trigger frame.

12. The method of claim 8, wherein each of the first trigger frame and the second trigger frame comprises at least one user information field following the special user information field, the at least one user information field corresponding to the at least one second device.

13. The method of claim 1, wherein
the feedback frame comprises at least one multiple-input multiple-output (MIMO) control field respectively corresponding to the at least one second device; and
each of the at least one MIMO control field comprises an identifier subfield and the sounding dialog token number field, the identifier subfield identifying a respective second device among the at least one second device.

14. The method of claim 13, wherein the feedback frame comprises an action field having a value indicating uplink compressed beamforming.

15. The method of claim 13, wherein the feedback frame comprises at least one beamforming report field respectively corresponding to the at least one second device, the at least one beamforming report field being respectively adjacent to the at least one MIMO control field.

16. The method of claim 15, wherein an average signal-to-noise ratio (SNR) subfield is omitted in each of the at least one beamforming report field.

17. The method of claim 13, wherein
the providing the feedback frame comprises transmitting a first PPDU including the feedback frame to the at least one second device; and
the providing the second trigger frame comprises transmitting a second PPDU including the second trigger frame to the at least one second device.

18. A first device comprising:
a transceiver; and
processing circuitry configured to,
transmit a first trigger frame to at least one second device through the transceiver, the first trigger frame requesting at least one sounding null data packet (NDP),
transmit a feedback frame to the at least one second device through the transceiver, the feedback frame including feedback information generated based on the at least one sounding NDP, and
transmit a second trigger frame to the at least one second device through the transceiver, the second trigger frame requesting at least one beamformed physical layer protocol data unit (PPDU),
wherein each of the first trigger frame and the feedback frame comprises a sounding dialog token number field having a sounding sequence number.

19. A wireless communication method by a second device, the method comprising:
transmitting a sounding null data packet (NDP) to a first device in response to receiving a first trigger frame requesting the NDP from the first device;
generating a beam steering matrix based on feedback information included in a feedback frame received from the first device; and
transmitting a beamformed physical layer protocol data unit (PPDU) to the first device based on the beam steering matrix in response to receiving a second trigger frame requesting the beamformed PPDU from the first device,
wherein
each of the first trigger frame and the feedback frame comprises a sounding dialog token number field having a sounding sequence number, and
the generating the beam steering matrix generates the beam steering matrix in response to determining that a first sounding sequence number included in the first trigger frame matches a second sounding sequence number included in the feedback frame.

* * * * *